United States Patent
Fujita

(10) Patent No.: US 7,009,718 B2
(45) Date of Patent: Mar. 7, 2006

(54) GRATING PATTERN PROJECTION APPARATUS USING LIQUID CRYSTAL GRATING

(75) Inventor: Hiroo Fujita, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 260 days.

(21) Appl. No.: 10/297,409

(22) PCT Filed: Jun. 6, 2001

(86) PCT No.: PCT/JP01/04790

§ 371 (c)(1),
(2), (4) Date: Dec. 6, 2002

(87) PCT Pub. No.: WO01/94880

PCT Pub. Date: Dec. 13, 2001

(65) Prior Publication Data

US 2004/0046966 A1    Mar. 11, 2004

(51) Int. Cl.
*G01B 11/24* (2006.01)

(52) U.S. Cl. .................................. 356/604

(58) Field of Classification Search ......... 356/601–608
See application file for complete search history.

(56) References Cited

U.S. PATENT DOCUMENTS

| 4,349,277 A | * | 9/1982 | Mundy et al. ............... 356/604 |
| 4,837,732 A | * | 6/1989 | Brandestini et al. .......... 433/29 |
| 5,450,204 A | * | 9/1995 | Shigeyama et al. ......... 356/604 |

FOREIGN PATENT DOCUMENTS

| JP | 4-98106 | 3/1992 |
| JP | 11-83454 | 3/1999 |
| JP | 2001-108422 | 4/2001 |

\* cited by examiner

*Primary Examiner*—Richard A. Rosenberger
(74) *Attorney, Agent, or Firm*—Finnegan, Henderson, Farabow, Garrett & Dunner, L.L.P.

(57) ABSTRACT

A lattice pattern projector for measuring a three-dimensional shape with enhanced accuracy while shortening the measuring time using a lattice pattern projection method, characterized by comprising a light source section (101), a liquid crystal lattice (111), a section (102) for projecting a lattice pattern, formed by passing the outgoing light from the light source section through the liquid crystal lattice, to an object for measurement, a section (112) for driving the liquid crystal lattice such that a linear intensity distribution is present in one period of the lattice pattern, a section (104) for detecting the lattice pattern projected to the object for measurement and deformed, and an operating section (114) for converting the linear intensity distribution in each period of the deformed lattice pattern into a linear phase distribution having a phase varying linearly.

16 Claims, 21 Drawing Sheets

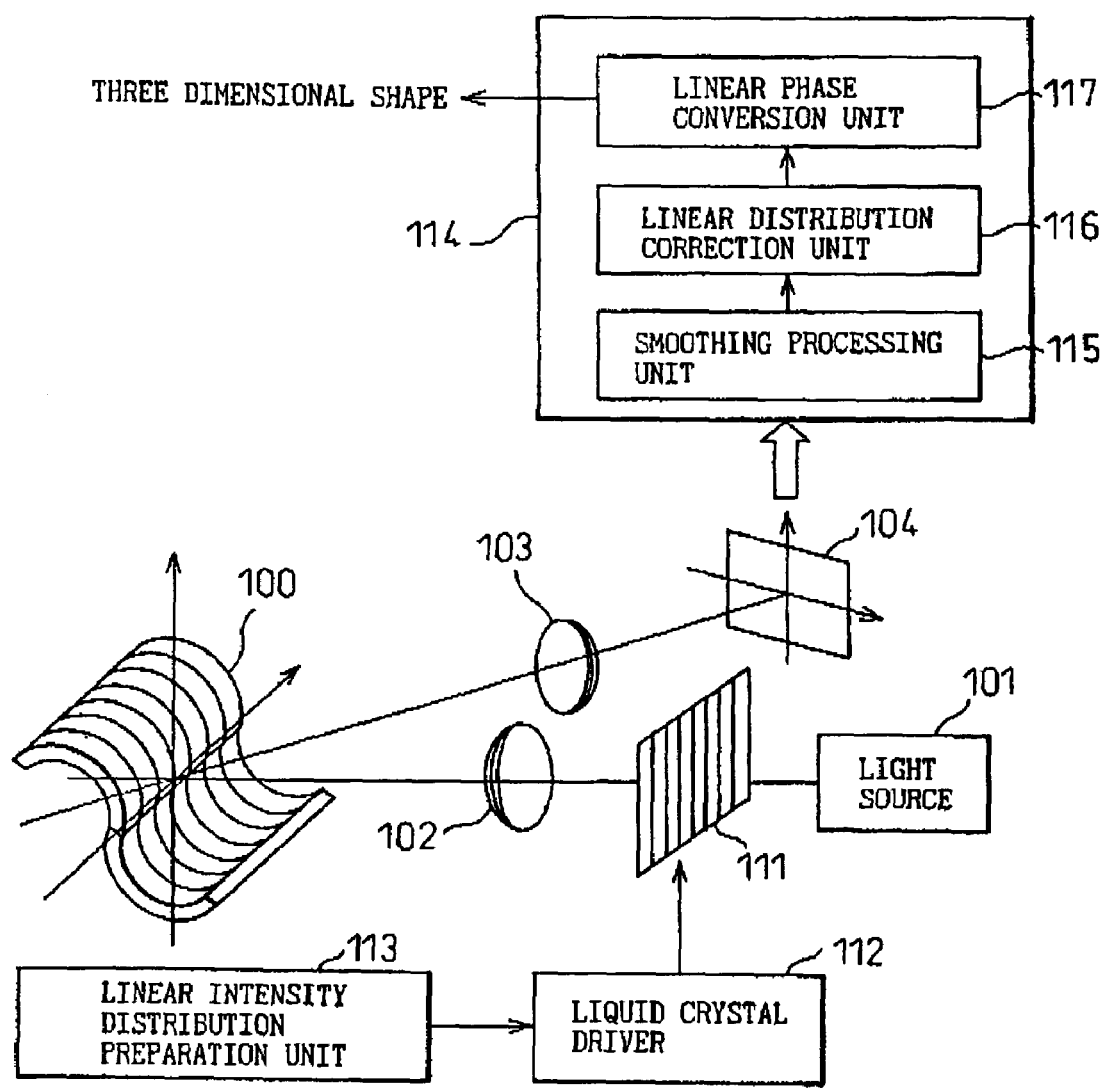

GRATING PATTERN PROJECTION APPARATUS USING LIQUID CRYSTAL GRATING

FIELD OF THE INVENTION

The present invention relates to a structure and method for processing images and for preparing a grating pattern for a three dimensional shape measuring device using a grating pattern projection method.

BACKGROUND OF THE INVENTION

In recent years, in many fields such as industry, medicine and fashion, the requirements for three dimensional shape measurement have increased, in particular with the desire for non-contact measurement devices using optical means. Laser interferometers are widely used in the case of areas whose surface irregularities are in the order of micrometers (μm). However, for areas whose irregularities are 100 μm or more, another measuring means is required in place of the laser interferometer. Typical shape measuring methods in this case are a light-section method of scanning a slit shaped laser beam above the surface of an object, a moiré pattern measuring method, a grating pattern projection method, and the like. Among these, the grating pattern projection method has many advantages such as simple measurement processing, a simple device structure, high measurement precision, and the like, and is therefore suitable for three dimensional shape measurement.

FIG. 24 and FIG. 25 show the principle of three dimensional shape measurement using a grating pattern projection method. FIG. 24 is an example of the principle structure of a grating pattern projection device. A light source section 401 is constructed from a white light source and the like for lighting, such as a halogen lamp or the like, and illuminates a grating 411. In the grating 411, a plurality of linear grating patterns are formed having a predetermined pitch and predetermined transmitted light intensity distribution. The grating pattern of the grating 411 is enlarged or reduced by a projection lens 402 and projected onto an object 400 whose three dimensional shape is to be measured. The projected grating pattern is deformed (curved) according to the degree of irregularities of the object 400. Where the irregularities are small, deformation of the projected grating pattern is small, and where the irregularities are large, deformation of the projected grating pattern is large. Also, because the direction in which the grating pattern is distorted according to the direction of the irregularities is opposite thereto, the direction of the irregularities in the object 400 can be distinguished from the distortion direction of the grating pattern.

The two dimensional image of the grating pattern (hereafter referred to as 'distorted grating pattern') distorted according to the irregularities of the object 400 is detected by an image detecting section 404 comprising a CCD camera or the like via an image pickup lens 403 from a direction different to the projected direction. A data processing section 414 image processes the two dimensional image of the deformed grating pattern detected by the image detecting section 404 and arithmetically processes fluctuations in the intensity distribution thereof to calculate the three dimensional shape of the object 400.

When the two dimensional image of the deformed grating pattern is image processed to calculate the three dimensional shape of the object 400, a triangulation method determined by the distances and angles of the triangular shape between the grating 411, the object 400 and the image detecting section 404. FIG. 25 shows the principle of the triangulation method. In the triangular shape formed by the three axes of the projection light axis 420, monitor light axis 422 and base line axis 424, if the height of the position 426 of the object 400 is changed by Δh, the monitor light axis 422 moves in parallel to the broken line 423 and detected position in the detection plane 427 shifts by ΔX. In other words, the height difference Δh appears as the positional difference ΔX in the plane of the two dimensional image. Consequently, irregularity information of the object 400 can be calculated from fluctuations in the intensity distribution of the deformed grating pattern image. The intensity distribution at each of the pixel positions p (x,y) in the image detecting section 404 is converted to a three dimensional coordinate P (X,Y,Z) by the calculations of the triangulation method determined by the base line length L, angles θ and φ of the triangular shape.

When image processing of the deformed grating pattern is performed by the grating pattern projection device having the above structure, not only the Z coordinate of the coordinates P (X,Y,Z) of the object 400, but the X-Y coordinates of the coordinates P of the object 400 must be measured with high in-plane resolution. For that reason, it is necessary to set a specified intensity distribution with a gradient in the light intensity distribution such that a position of the projected grating pattern within one cycle can be finely distinguished. Further, since fluctuations in the intensity distribution of the deformed grating pattern image are not only affected by irregularities in the object 400 but are also affected by surface reflections on the object 400, it is necessary to detect intensity fluctuations due to irregularities only, without them being influenced by surface reflections.

In conventional grating pattern projection devices, as shown in the waveform in FIG. 26(a), the light intensity distribution for the interval P of each cycle of the grating pattern is set as a sine wave. Where a sine wave intensity distribution grating pattern is projected onto the surface of an object, the intensity distribution I(x) of the grating pattern at a position x on the object is as shown in formula (1).

$$I(x)=B(x)+A(x)\cos[\phi(x)+\alpha] \quad (1)$$

Where B(x) is bias intensity, A(x) is amplitude, and α is an initial phase. The sine wave intensity distribution grating pattern detects the phase φ(x) of each position from the intensity I(x). However, because the intensity I(x) fluctuates due to surface reflections, those surface reflections cannot be detected by a single grating pattern alone. Therefore, a plurality of grating patterns, having the same sine wave intensity distribution and with only their initial phases α changed, are projected in sequence onto the object 400, the plurality of deformed grating pattern images are detected, and the intensity distributions of the plurality of images are processed to measure the three dimensional shape. This method is called a phase shift method.

The waveforms 432, 433, 434 and 435 of the plurality of sine waves having different initial phases are shown in FIG. 26(b). The phase shift method will be explained using FIG. 26(b). The phase shift method of this example changes the initial phases α to 0, π/2, π, and 3π/2. If the intensities at the positions x of the deformed grating patterns, when the sine wave intensity distribution grating patterns of waveforms 432 to 435 are projected, are given as I0, I1, I2 and I3, their phases φ(x) are calculated by formula (2).

$$\phi(x)=\arctan[(I3-I1)/(I0-I2)] \quad (2)$$

As the phase φ(x) within one cycle of a grating pattern is a value within the range of 0 to 2π, the three dimensional shape is measured from the optical arrangement shown in FIG. 24 by connecting the phases of each grating pattern in sequence.

In formula (2), the bias intensity B(x) and amplitude A(x) have been omitted. In other words, by using the phase shift method, the influence of surface reflections is not received and phases due purely to irregularities can be detected. Although the above is an example where the initial phase α of the grating pattern is changed in steps of π/2, a method of dividing one cycle of the grating pattern into three and shifting the initial phase α in steps of 2π/3 to detect three deformed grating pattern images can also be used.

Next, a conventional method of preparing a grating pattern will be shown. In an initial grating pattern projector, a grating pattern is prepared by drawing it directly on a glass substrate or film. As the deformation of the deformed grating pattern image is determined depending on the irregularities of the object 400, it is necessary for the grating pitch to be changeable in accordance with irregularities, so that the grating pitch is greater when the irregularities are larger, and less when the irregularities are smaller. Since the grating pitch and intensity distribution are fixed if the grating is drawn on a glass substrate, a number of types of grating with different grating pitches are prepared and these gratings are selected and used according to the irregularities of the object to be measured. When the phase shift method is used, the grating 411 is moved at a fixed pitch using a mechanized stage or the like.

Recently, sine wave intensity distribution grating patterns have been prepared using liquid crystal elements. Liquid crystals are elements whose transmitted light intensities change in accordance with a driving voltage, and can provide a grating pattern having adjustable grating pitch and intensity distribution by means of voltage control. An example of the electrode structure of a conventional liquid crystal grating is shown in FIG. 27. The electrodes 441 have a structure wherein a plurality of separated independent pixels are formed in a matrix shape having m number of row electrodes C1, C2, . . . Cm and n number of column electrodes R1, R2, . . . Rn. In the matrix shaped electrode structure, a signal comprising multiple voltage levels is applied to the row electrodes and column electrodes to perform time division driving.

In FIG. 28(a), transmitted light intensity characteristics with respect to the driving voltages of the liquid crystal elements are shown. The transmitted light intensity of liquid crystals changes according to the driving voltage, and has the characteristic that although the transmitted light intensity changes substantially in proportion to the driving voltage when the driving voltage is low, and the transmitted light intensity saturates when the driving voltage is increased. Given this, voltages corresponding to the light intensity of, for example, 452 at point A, 453 at point B, and 454 at point C, are applied to the liquid crystals, according to a set sine wave intensity distribution.

An example of sine wave intensity distribution is shown in FIG. 28(b). As the pixels of the liquid crystal grating are separated, it is a discrete intensity distribution in the horizontal and vertical directions due to the gaps of the liquid crystal grating. Also, it is a discrete intensity distribution to the extent that the number of gradients is low (the driving voltage step width is wide). The transmitted light intensities of each of point A, point B, and point C when driven at the voltages shown in FIG. 28(a) are 462, 463, and 464 in FIG. 28(b). In this way, voltages that become sine wave intensity distributions are set according to the voltage—transmitted light intensity characteristic of liquid crystal. Since liquid crystal gratings have discrete intensity distribution, in making the gradation of the sine wave high to make a smooth intensity distribution, the driving voltage width is set narrow. When using liquid crystal the phase shift method is realized by electrical control.

In a conventional grating pattern projector, it is necessary to make the intensity distribution of the grating pattern a sine wave. When making a sine wave intensity distribution grating pattern with liquid crystal, in order to approximate an ideal sine wave distribution, it is necessary to increase the gray level (intermediate tone intensity) gradation (normally 32 gradations or more). However, due to the non-linearity of the voltage—transmitted light intensity characteristic of liquid crystal shown in FIG. 28(a), creation of sine wave distribution with high gradation is difficult. In particular, because the change of intensity of the transmitted light with respect to the applied voltage decreases toward the maximum intensity and minimum intensity of the sine wave, the sine wave in these areas becomes distorted. Since arithmetically processing the distortion of the sine wave to correct it to an ideal sine wave is difficult, phase calculation precision is reduced by the distortion of the sine wave and three dimensional shape measurement errors increase.

Also, when detecting phase distribution of the deformed grating pattern image of the sine wave intensity distribution, the value of the sine wave intensity must be detected with high precision. Even when an ideal sine wave intensity distribution has been produced, as the change in the intensity of the sine wave is small in the proximity of the peak thereof, it is difficult to precisely detect the intensity in that area. As a result, when using the phase shift method, phase calculation errors occur due to intensity detection errors when calculating phases from formula (2), and three dimensional shape measurement errors increase. Moreover, in the case of grating patterns having low gradient sine wave intensity distribution, in-plane resolution of the deformed grating pattern decreases, therefore the in-plane resolution of the three dimensional measurement decreases.

Further, when using the conventional phase shift method by means of sine wave intensity distribution, the intensity distribution of the grating pattern is a sine wave, it is necessary to shift the initial phase of the sine wave by π/2 each time and project four times. As the grating pattern is projected four times, there is the problem of the increase in measurement time. when realizing sine wave intensity distribution by means of a liquid crystal grating, because the transmitted light intensity characteristic of the liquid crystal elements is non-linear, there is the problem that the change in intensity with respect to the change in voltage towards the peak intensity area is small compared to the intermediate intensity area of the sine wave, and the sine wave is distorted towards the peak intensity. Also, with regard to the drive signal generating the sine wave, the higher the gradation, the more complex a drive signal is required, therefore there is the problem that increasing the gradation of the sine wave is difficult.

Further, due to the sine wave distortion, phase errors occur when converting the intensity distribution p (x,y) to phase distribution φ(x,y), so there is the problem that three dimensional shape measurement errors become large. Also, there is the problem that, because trigonometric function processing is needed when converting sine wave intensities to phases, intensity data of obtained two dimensional images are standardization processed, a trigonometric table must be referred to for arctan values, and the like, the image data processing structure is complicated. Further, there is the problem that, because sine wave intensity distribution is non-linear, when calculating phases, phase calculation is necessary for each position on the image, leading to a long processing time.

Moreover, although determining the extent of distortion and correcting the sine wave distribution is permissible when the intensity distribution of the sine wave is distorted, determining the sine characteristic is difficult because the sine wave is non-linear. Also, even if the distortion of the sine wave can be determined, when correcting the intensity distribution by changing the effective voltage, the effective voltage must be changed in small steps. As a result, in actuality, the sine wave intensity distribution cannot be corrected and performing precise three dimensional shape measurement is difficult.

Further, the electrode structure of conventional liquid crystal gratings is a matrix shape wherein individual pixels are separated. The matrix shape has gaps between adjacent pixels, its effective pixel surface area is reduced (aperture rate is reduced) and its light usage efficiency is decreased. Also, the discontinuity of its intensity distribution is high because the gaps between the pixels are large, and optical noise occurs in the grating pattern. Furthermore, sine wave intensity detection errors increase due to the optical noise. As the matrix shape is time division driven, a complex drive signal having multiple potential levels is necessary. Moreover, as the liquid crystal elements are such that changes in the transmitted light intensity are non-linear with respect to changes in the drive voltage, setting the transmitted light distribution of the liquid crystals by means of the time division drive signal so as to have a sine wave intensity distribution is difficult.

Therefore, an object of the present invention is to provide a three dimensional shape measuring device using a liquid crystal grating, for solving the above problems which occur due to using a grating pattern having a sine wave intensity distribution.

Another object of the present invention is to provide a three dimensional shape measuring device with high measuring precision that prepares a grating pattern whose intensity distribution changes to a linear form, using a liquid crystal grating.

A further object of the present invention is to provide a three dimensional shape measuring device with high measuring precision, that detects phase distribution that changes to linear from only one phase image signal without performing phase shifting, whose grating pattern preparation is simple, and whose measuring time is short.

Still another object of the present invention is to provide a three dimensional shape measuring device with high measuring precision whose grating pattern preparation is simple and whose measuring time is short, by determining the non-linear characteristic of intensity distribution to correct it to a linear intensity distribution.

SUMMARY OF THE INVENTION

To attain the above objects, the grating pattern projection apparatus of claim 1 of the present invention comprises a light source portion, a liquid crystal grating, a projector for projecting a grating pattern formed by light emitted from the light source passing through the liquid crystal grating onto an object to be measured, a liquid crystal driver for driving th liquid crystal grating so that one cycle of the grating pattern has a linear intensity distribution, a detector for detecting a deformed grating pattern distorted by projecting the grating pattern onto an object to be measured, and a processor for converting the linear intensity distribution of each cycle of the deformed grating pattern into a linear phase distribution for changing a phase linearly.

Also, the liquid crystal driver preferably sets the pitch of the grating pattern in accordance with surface irregularities of the object to be measured.

Further, the liquid crystal driver preferably prepares a triangular wave intensity distribution such that a width of an area whose intensity increases linearly and a width of an area whose intensity decreases linearly are equal in one cycle of the grating pattern, and drives the liquid crystal grating so that the grating pattern has a triangular wave intensity distribution.

Further, the processor preferably detects a maximum intensity or a minimum intensity of each cycle of the deformed grating pattern, converts the intensity at each position of the deformed grating pattern into a standardized intensity with the maximum intensity or the minimum intensity as a standard, and performs. proportional processing of the standardized intensity to convert an intensity that changes linearly in one cycle of the deformed grating pattern into a phase that changes linearly between 0 and $2\pi$.

Further, the processor preferably comprises a smoothing processor for converting the intensity of the deformed grating pattern into an intensity distribution that changes smoothly, and a linear distribution corrector for correcting intensity changes in each intensity increase area and intensity decrease area of the smoothing processed deformed grating pattern into an intensity distribution that approximates a straight line, so that it changes linearly.

Further, it is preferable that the grating pattern includes a first grating pattern and a second grating pattern of the same grating pitch and whose intensity distributions are mutually inverse, the projector sequentially projects the first grating pattern and the second grating pattern individually onto an object to be measured, the detector sequentially detects a first deformed grating pattern caused by the first grating pattern and a second deformed grating pattern caused by the second grating pattern, and the processor determines whether there is a fluctuation in the reflection state of an object to be measured by detecting changes in the maximum intensity and minimum intensity of each cycle of the first and second deformed grating patterns, and either one of positions where an intensity of the first and second deformed grating patterns change discontinuously, or positions where the intensity sum of each position of the first and second deformed grating patterns changes discontinuously, and converts the linear intensity distributions of the first and second deformed grating patterns to linear phase distributions when the processor determines that the reflection state does not fluctuate, and when the processor determines that the reflection state does fluctuate, the processor converts the intensity distributions within a range where the reflection state fluctuates in the linear intensity distributions of the first and second deformed grating patterns to a first linear phase distribution for changing a phases linearly, converts the intensity distributions within a range where the reflection state does not fluctuate in the linear intensity distributions of the first and second deformed grating patterns to a second linear phase distribution for changing a phases linearly, and obtains the linear phase distribution by smoothly connecting the first and second phase distributions at positions where the intensity distributions of the first and second deformed grating patterns change discontinuously or positions where the intensity sum of the first and second deformed grating patterns changes discontinuously.

Further, the processor preferably converts the intensity distributions of the first and second deformed grating patterns into intensity distributions that change smoothly, and corrects the respective intensity distributions of the smoothing processed first and second deformed grating patterns to intensity distributions wherein the intensity changes of intensity increase areas and intensity decrease areas approximate straight lines so that they change linearly.

Further, it is preferable that the grating pattern includes a first grating pattern and a second grating pattern of the same grating pitch and whose intensity distributions are mutually inverse, the projector projects any one of the first grating pattern or the second grating pattern onto an object to be measured when the surface of an object to be measured is formed from a material of uniform reflectivity, and sequentially projects the first and second grating patterns onto an object to be measured when the surface of an object to be measured is formed from a material of a plurality of reflectivities, and the detector sequentially detects a first deformed grating pattern caused by the first grating pattern and a second deformed grating pattern caused by the second grating pattern.

Further, it is preferable that the liquid crystal grating has a plurality of liquid crystal elements formed in the liquid crystal grating, a single common electrode provided on one side of the plurality of liquid crystal elements, and a stripe electrode having a plurality of stripe shape electrodes and formed in a discrete arrangement provided opposite the common electrode and the liquid crystal driver applies a rectangular wave signal having the same duty ratio at the same two intensities to the common electrode and the stripe electrodes, changes the phases of the rectangular wave signal applied to the common electrode and the rectangular signal applied to the stripe electrode according to the linear intensity distribution, prepares the grating pattern having a linear intensity distribution in every cycle.

Further, it is preferable that the grating pattern is a pattern of one phase only, the projector projects a single phase grating pattern onto an object to be measured one time only, the detector detects a single phase deformed grating pattern caused by the single phase grating pattern one time only, and the processor has a single phase signal intensity fluctuation detector for detecting a peak intensity of each cycle of the single phase grating pattern, the peak intensity position, and the rate of intensity change, and a phase distribution calculator for converting the single phase deformed grating pattern to a linear phase distribution according to fluctuation of the peak intensity and rate of intensity change.

Further, the liquid crystal driver preferably drives the liquid crystal grating so that the grating pattern has a triangular wave intensity distribution, by preparing a triangular wave intensity distribution wherein, in one cycle of the grating pattern, the width of an area whose intensity increases linearly and the width of an area whose intensity decreases linearly are equal.

Further, the liquid crystal driver preferably drives the liquid crystal grating by means of a signal whose voltage in one cycle is a discrete stepped shape and changes symmetrically every half cycle, according to the number of gradations representing the fineness of intensity changes of linear intensity distribution.

Further, the single phase signal intensity fluctuation detector preferably, when the peak intensity in each cycle of the single phase deformed grating pattern is constant, obtains a linear phase distribution from a rate of intensity change where th reflectivity of an object to be measured is determined to be constant and, when the peak intensity fluctuates, obtains a linear phase distribution from a peak intensity and rate of intensity change where the reflectivity of an object to be measured is determined to be fluctuating in the vicinity of positions where the peak intensity fluctuates.

Further, the single phase signal intensity fluctuation detector preferably detects a rate of intensity change from a difference value of a pixel intensity of a previously set step pixel interval in one cycle of the single phase deformed grating pattern, sets a slice intensity level for separating the rate of intensity change into discrete segments when the rate of intensity change in one cycle fluctuates, compares the slice intensity level and rate of intensity change to sort the rate of intensity change into areas according to. the slice intensity level, and detects the boundary positions of the areas.

Further, it is preferable that a linear phase distribution calculator, when the rate of intensity change in one cycle of the single phase deformed grating pattern is detected as constant by the single phase signal intensity fluctuation detection portion, standardizes a phase difference between maximum intensities or minimum intensities in one cycle of the single phase deformed grating pattern to $2\pi$, and converts each pixel position from a proportional relationship between a standard pixel number between maximum intensities or minimum intensities and each pixel position in one cycle to a phase from 0 to $2\pi$, to obtain a linear phase distribution that changes linearly at a constant gradient in one cycle.

Moreover, it is preferable that the linear phase distribution calculator, when the rate of intensity change in one cycle of a single phase deformed grating pattern is detected as fluctuating by the single phase signal intensity fluctuation detector, standardizes a phase difference between maximum intensities or minimum intensities in one cycle of the single phase deformed grating pattern to $2\pi$, converts each pixel position within an area according to a proportional relationship between a standard pixel number between maximum intensities or minimum intensities and each pixel position within the area, as well as a slice intensity level of the area, to a phase from 0 to $2\pi$, and connects phases of each area at boundary positions of each area, to obtain a linear phase distribution that changes linearly at a constant gradient in one cycle.

Furthermore, it is preferable that the liquid crystal driver drives the liquid crystal grating by means of a preliminary linear intensity distribution signal, the projector projects a preliminary grating pattern onto an object to be measured according to the preliminary linear intensity distribution signal, the detector detects a preliminary deformed grating pattern distorted by projecting the preliminary grating pattern onto an object to be measured, and the liquid crystal driver has an intensity distribution judgment unit for detecting a non-linear characteristic of the preliminary deformed grating pattern and positions having a non-linear characteristic, and a linear distribution signal corrector for, when a non-linear characteristic of the preliminary deformed grating pattern is detected, correcting the preliminary linear intensity distribution signal so that the preliminary deformed grating pattern does not have a non-linear characteristic, and the liquid crystal driver uses a corrected preliminary linear intensity distribution signal to drive the liquid crystal grating for measuring.

Further still, it is preferable that the intensity distribution judgment unit detects a difference intensity between previously set step pixels with respect to one image area of the preliminary deformed grating pattern and, determines that preliminary deformed grating pattern does not have a non-linear characteristic in a case where an absolute value of a difference intensity in one cycle of the preliminary deformed grating pattern is regarded as substantially constant, determines that the preliminary deformed grating pattern does not have a non-linear characteristic in a case where the absolute value of a difference intensity in one cycle of the preliminary deformed grating pattern fluctuates over a previously set limit, determines that the preliminary deformed grating pattern has a non-linear characteristic in a case where a difference intensity close to 0 occurs in the vicinity where the difference intensity in one cycle of the preliminary deformed grating pattern changes from a maximum value to a minimum value, determines that a nonlinear characteristic has occurred in the vicinity of the maximum intensity of the preliminary deformed grating pattern in a case and where a difference intensity close to 0 occurs in the vicinity where the difference intensity in one cycle of the preliminary deformed grating pattern changes from a minimum value to a maximum value, and determines that a nonlinear characteristic has occurred in the vicinity of the minimum intensity of the preliminary deformed grating pattern in a case where a difference intensity close to 0 occurs in the vicinity where the difference intensity in one cycle of the preliminary deformed grating pattern changes from a maximum value to a minimum value.

Yet further, it is preferable that the linear distribution signal corrector, according to the extent of a non-linear characteristic of a preliminary deformed grating pattern determined by the intensity distribution judgment unit and positions where the non-linear characteristic occurs, changes the voltage level of the preliminary linear intensity distribution signal and phases between signals to control a drive effective voltage of the liquid crystal grating, performs control to reduce the drive effective voltage of the liquid crystal grating where a non-linear characteristic is determined by the intensity distribution judgment unit to have occurred in a maximum intensity area of the preliminary deformed grating pattern, and performs control to increase the drive effective voltage where a non-linear characteristic is determined by the intensity distribution judgment unit to have occurred in a minimum intensity area of the preliminary deformed grating pattern.

Yet further still, it is preferable that the linear distribution signal corrector, according to the extent of a non-linear characteristic of a preliminary deformed grating pattern determined by the intensity distribution judgment portion and positions where the non-linear characteristic occurs, changes the number of gradations of the preliminary linear intensity distribution signal and phases between signals to control a drive effective voltage of the liquid crystal grating, and reduces the number of gradations where a non-linear characteristic is determined by the intensity distribution judgment portion to have occurred in a maximum intensity area of the preliminary deformed grating pattern.

EFFECTS OF THE INVENTION

The grating pattern projection apparatus according to the present invention has an intensity distribution, pattern and pitch that are freely changeable, by use of a liquid crystal grating. Also, by making the intensity distribution linear, it can be converted to phase distribution by a simple comparison process. Further, if the intensity distribution of a grating pattern distorted to a non-linear shape due to noise is subjected to an arithmetic processing operation for converting it into a linear intensity distribution, a phase distribution from which the effect of the noise has been removed can be detected, improving the precision of three-dimensional shape measurement. Further still, if it approaches a straight line, increasing the linear intensity gradation of the grating pattern becomes unnecessary, and control of the grating pattern becomes easier.

Also, projection of a grating pattern in response to the surface reflection state of the object can be selected. Where the surface reflection state is constant, the grating pattern need only be projected once. If the surface reflection state fluctuates, the grating pattern need only be projected twice with the intensity distribution inverted in each case. By reducing the number of grating patterns projected, the measurement time is shortened.

In addition, where the surface reflection state fluctuates, boundary positions where the surface reflection state changes can be easily determined from the intensity fluctuations in the deformed grating pattern obtained by the two projections. As a result, the effect of intensity fluctuations due to fluctuations in the surface reflection state can be removed, a phase distribution according to irregularities can be detected with precision, and a three dimensional shape can be measured faster and with more precision than with a sine wave intensity phase shift of the prior art.

Moreover, by using a stripe shaped electrode structure, a static drive can be applied, and any light intensity distribution can easily be realized with a simple drive signal, by a pulse width modulation method using two signal levels. Also, the aperture rate of the pixels can be improved and grating patterns with little noise can be projected. As a result, a grating pattern having a shape that matches the irregular shape of the object can be projected onto the object, and measurement precision and reliability can be improved. In addition, as the process from preparation of the grating pattern to two dimensional image processing is done by computer processing, completely automatic measurement in real time is possible.

Further, the grating pattern projection apparatus according to the present invention projects a grating pattern having a linear intensity distribution using a liquid crystal grating. By using a liquid crystal grating, the intensity distribution and pattern pitch of the grating pattern can be freely changed. At this time, the intensity distribution of the grating pattern is set at a linear distribution having a symmetrical triangular waveform. By making the intensity distribution linear, even if it is a distribution of as low as eight gradations, a grating pattern of the same high surface density as that having a high number of gradations can be prepared, improving measurement resolution. Also, as it can be performed with low gradation, preparation of the single phase signal for driving the liquid crystal grating is easier.

Furthermore, the number of times the grating pattern is projected is only once, and the deformed grating pattern image is detected only once. As once only grating pattern projection and image detection is acceptable, the measurement time until image detection is shortened, and high speed measurement, four times faster or more compared to prior art sine wave grating projection, is possible. Also, as it is acceptable to image process a single phase image signal, the processing time is greatly shortened.

Also, when detecting a deformed grating pattern image of a single phase and processing a single phase image signal, in particular, both the peak intensity and change of intensity rate of each cycle in the single phase image signal are detected and the phase distribution is calculated according to fluctuations therein. By detecting the two sets of intensity data in combination, fluctuations in the reflection state and irregularity fluctuations of the object can be distinguished, improving measurement reliability. Also, since the basic intensity distribution of the single phase image signal is linear, the above detection can be performed between discrete step pixels, and the processing time shortened.

Further, by separating the rate of intensity change into discrete segments, the effect of minute intensity fluctuations that become noise is removed, and a phase distribution that changes to linear, by grading it according to the segmented rate of intensity change in each area, is calculated. A linear phase distribution is obtained from a simple proportional relationship of the number of pixels in each area to the standard number of pixels in one cycle, therefore phase calculation processing is easy. This also results from the standard intensity distribution of the single phase signal being linear.

Also, as the grating pattern projection apparatus according to the present invention projects the grating pattern having a linear intensity distribution using a liquid crystal grating, if the intensity distribution of a preliminarily projected grating pattern is a non-linear distribution, it is corrected to a linear intensity distribution. The pixels of the liquid crystal grating are set in stripe shapes and a drive signal that sets a linear intensity distribution by means of a static drive is prepared. As the drive signal can be of a dual value intensity level, and only the phases between drive signals need to be changed, preparation of the drive signal is simple. Also, if the intensity distribution is set to linear, there need only be a small number of intensity gradations. Even if it is an intensity distribution with a number of gradations as low as eight, a grating pattern of the same high surface resolution as that having a high number of gradations can be prepared, and measurement resolution can be improved.

Further, with respect to determining the intensity distribution, a non-linear characteristic is determined from fluctuation of a difference intensity of the detected grating pattern image. Using the data on the differential intensity, the extent of the non-linear characteristic and the position(s) at which the non-linear characteristic occurs can be detected by simple arithmetic processing. With respect to correction of the intensity distribution, because the effective drive voltage of the liquid crystal can be easily changed by merely changing the voltage and phase of a dual value voltage level, correction to a linear intensity distribution can be easily performed.

Further, by using the grating pattern corrected to a linear intensity distribution in actual measurement, the intensity distribution and phase distribution of the deformed grating pattern directly correspond, so that the phase distribution can be calculated with high precision, Consequently, high precision three dimensional shape measurement is possible. Also, by making the intensity distribution linear, the number of times the grating pattern is projected need only be once or twice, shortening the measurement time until image detection, and making possible high speed measurement compared to prior art sine wave grating projection. Further still, even if the contrast or the like of the grating pattern fluctuates due to fluctuations of the reflectivity of the object, stable, high precision measurement is possible, without receiving the effect of the fluctuations.

BRIEF DESCRIPTION OF THE DRAWINGS

FIG. 1 is a diagram for explaining the structure and operation of a first embodiment according to the present invention.

DESCRIPTION OF PREFERRED EMBODIMENT (First Embodiment)

Figure 2A:
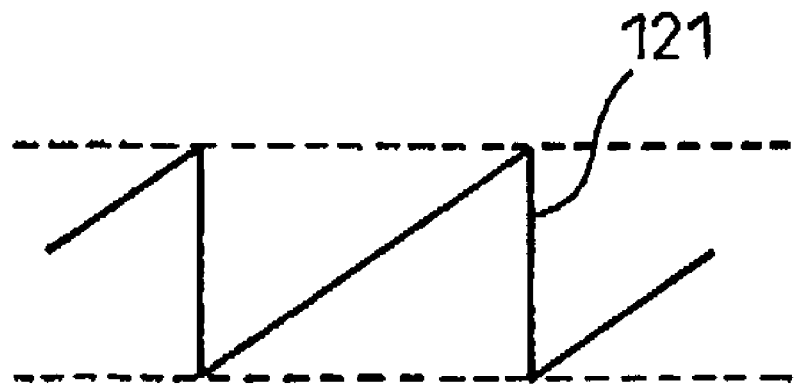
FIG. 2(a) and FIG. 2(b) are diagrams of examples of linear intensity distribution waveforms.

In a grating pattern projection apparatus according to a first embodiment, it is necessary to project a grating pattern having characteristics that correspond to the irregularities of the object whose three dimensional shape is to be measured. Therefore, a liquid crystal grating formed by liquid crystal elements is used, so that the pitch and intensity distribution of the projected grating pattern can be changed. If the pitch of the grating pattern is made fine, the resolution is improved, therefore, with respect to the prior art in which the resolution of the projected area is 0.1%, the present invention can achieve a resolution of the projected area of 0.03%. For example, where the projection surface area of the grating pattern is 100 mm×100 mm, irregularities can be measured with a resolution of from 0.1 mm to 0.03 mm.

When preparing a grating pattern with a liquid crystal grating, one electrode of the liquid crystal element has a single common electrode structure (common electrodes) with the same potential. The other opposite electrode has the pixels discretely formed at a constant pitch in one direction (X), and formed in a continuous striped structure (stripe electrodes) in a direction (Y) perpendicular to the direction (X). There are no gaps in the Y direction of the above stripe shaped pixel structure, so the aperture rate is increased and light utilization efficiency is increased.

In the stripe shaped pixel structure, the transmitted light intensity of the liquid crystal is controlled by a static type drive signal. With a static drive, since a rectangular wave signal with a 50% duty ratio is applied at two voltage levels to the common electrode and the stripe electrode, a simple drive signal can be used. Also, with the static drive, a predetermined voltage corresponding to the intensity distribution set in the striped pixels is independently applied. Further, with the static drive, using a pulse width modulation method for changing the phase of the signal applied to the stripe electrode with respect to the signal applied to the common electrode, the drive effective voltage of the liquid crystal is controlled and liquid crystal gradation control is performed.

In the grating pattern projection apparatus the intensity distribution of the projected grating pattern is important. This is because the intensity distribution of a deformed grating pattern image, deformed according to the irregularities of the object, and the position of the object are coordinated, to increase the spatial resolution of the measurement. As a result, it is set so that the intensity distribution in one cycle of the grating pattern is changed to linear. If the intensity distribution is linear, the phase also changes to linear, and the intensity distribution and phase distribution have a direct correspondence. In particular, a grating pattern having a triangular intensity distribution wherein the width of a linear area in which the intensity increases and the width of a linear area in which the intensity decreases are equal, and a phase distribution that is changed to a triangular waveform, is detected.

Also, as the liquid crystal grating is formed from discrete pixels and the liquid crystal grating is driven by discrete voltage steps, the intensity distribution of the projected grating pattern is a discrete distribution and the deformed grating pattern image has an intensity distribution that has been digitized. A smoothing (equalizing) process is performed on the deformed grating pattern image data to convert it to intensity data that has been smoothly changed. Further, the smoothing processed intensity distribution is corrected to approximate a straight line, and is corrected to an intensity distribution that changes linearly. Thus, a phase distribution that changes linearly is calculated from the corrected intensity distribution.

Where the phase distribution is detected from a linear intensity distribution image, the maximum intensity and minimum intensity of each cycle of the deformed grating pattern are deformed, these maximum and minimum intensities are taken as a standard, and the intensities of each position of the deformed grating pattern are standardized. These intensities that have been standardized and linearly changed are converted to phases of values that change linearly from 0 to $2\pi$ between standardized maximum intensities or between standardized minimum intensities of each cycle. As these standardized intensities change in straight lines, the conversion precision to phases is high. The phase distribution for each cycle are connected between each deformed grating pattern.

Where the surface reflection of the object to be measured is constant, the grating pattern having a linear intensity distribution need only be projected only once, and the three dimensional shape can be measured from the detected phase distribution. Consequently, phase shifting of the grating pattern is unnecessary. However, where the surface reflectivity of the object to be measured is not constant, whether the fluctuations in intensity distribution of the deformed grating pattern have occurred due to irregularities of the object or whether they have occurred due to fluctuations in the surface reflectivity of the object cannot be distinguished. In order to make this distinction, two types of grating patterns, a first grating pattern having a linear intensity distribution and a second grating pattern, whose phase is shifted by $\pi$ from that of the first grating pattern and whose intensity distribution is reversed, are prepared. Then, these two types of grating patterns are projected onto the object and a first deformed grating pattern image and second deformed grating pattern image are detected.

Where the maximum intensity and minimum intensity of the first and second deformed grating pattern images are constant, or where the sum of the intensities of the first and second deformed grating pattern images is constant, the surface reflectivity of the object is determined to be constant. If at this time it is thought that the intensity distribution has fluctuated due only due to the irregularities of the object, standardization processing and calculation of the phase distribution are performed, with the maximum intensity and minimum intensity of any one deformed grating pattern image from among the first deformed grating pattern image and second deformed grating pattern image as a standard.

Where the maximum intensities and minimum intensities of the first and second deformed grating pattern images change due to the projection position, or where the sum of the intensities of the first and second deformed grating pattern images fluctuates discontinuously, it is determined that the surface reflection state of the object is changed. In this case, the above standardization processing is performed using the intensity distribution of a deformed grating pattern image from among the first deformed grating pattern image and the second deformed grating pattern image. Next, a first phase distribution and a second phase distribution are calculated respectively with regard to a range in which the surface reflectivity changes and a range other than that in which the surface reflectivity changes. Further, the first phase distribution and second phase distribution are connected at a positions where the surface reflectivity changes.

The first embodiment according to the present invention will be explained in detail using the drawings.

FIG. 1 shows an outline of a grating pattern projector using a liquid crystal grating. The light source 101 is constructed from a light source for lighting such as a halogen lamp or the like, and emits a white light onto a liquid crystal grating 111 placed in front thereof. The liquid crystal elements that form the liquid crystal grating 111 are formed in a straight striped electrode pattern, N in number, having a constant pitch and shape as explained above, and are driven by a liquid crystal driver 112. The grating pattern having a linear intensity distribution is prepared from the liquid crystal grating 111. Linear intensity distribution data is prepared by a linear intensity distribution preparation unit 113, and drives the liquid crystal driver 112.

Figure 2B:
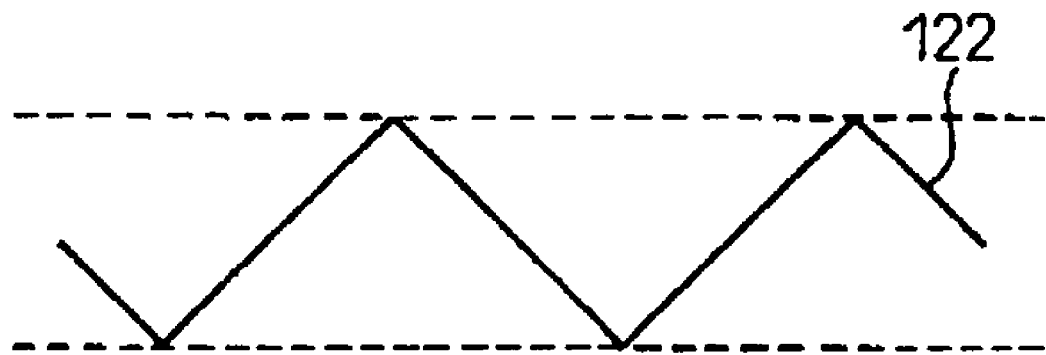

FIG. 2(a) shows a first waveform example having a linear intensity distribution. The waveform 121 is a waveform example having a saw tooth wave form in which the intensity increase area changes continuously and the intensity decrease area changes suddenly in a step form. FIG. 2(b) shows a second waveform example having a linear intensity distribution. The waveform 122 is a triangular waveform in which the intensity increase area and the intensity decrease area both change continuously and the widths of the intensity increase area and the intensity decrease area are equal. Although the waveforms 121 and 122 both have linear intensity distributions, the triangular wave intensity distribution shown in the waveform 122 is more favorable.

The liquid crystal grating 111 projects a grating pattern having a linear intensity distribution through a projection lens 102 and onto the object 100 whose three dimensional shape is to be measured. The grating pattern deforms (curves) according to the irregularities in the surface of the object 100, and a two dimensional image of the deformed grating pattern is detected by an image detection unit 104 comprising a CCD camera or the like, via a pickup lens 103 from a direction different from the projection direction. The detected deformed grating pattern image includes data relating to the irregularities of the object 100. The detected deformed grating pattern image is processed by a arithmetic processing portion 114 to measure the three dimensional shape of the object 100.

The arithmetic processing unit 114 performs image processing and the like on the deformed grating pattern having a linear intensity distribution, and is constructed from a smoothing arithmetic processing unit 115, a linear distribution correction unit 116, linear phase conversion unit 117, and the like. The projected grating pattern, due to the effect of the pixels of the liquid crystal grating 111 being discretely formed, the effect of the lens characteristics of the projection optical system, and the like, has an intensity distribution that does not change to a linear intensity distribution, but instead changes to a non-linear somewhat stepped shape. The deformed grating pattern image is smoothed by the smoothing arithmetic processing unit 115 by a method of moving averages or the like, to convert it into an image whose intensity distribution changes smoothly. Next, the image is further processed by the linear distribution correction unit 116 and converted into an image having a linear intensity distribution.

In the image having linear intensity distribution, the linear intensity distribution corresponds to the three dimensional shape of the object 100. The corrected intensity distribution is standardized and converted into a phase distribution. At this time, the linear phase conversion unit 117 detects the maximum intensity and minimum intensity of each cycle of the deformed grating pattern image having linear intensity distribution, and converts the linearly changed values from 0 to $2\pi$ between the maximum intensities or between the standardized minimum intensities to phases, with the maximum intensity and minimum intensity as standards. As the phase distribution corresponds to the irregularities of the object 100, the actual three dimensional shape is obtained by the triangulation method described above using the phase distribution.

The device structure shown in FIG. 1 is an example in which a three dimensional shape is measured from a single deformed grating pattern image, by projecting a grating pattern having a linear intensity distribution onto the object 100 only once. As fluctuations in the intensity distribution of the deformed grating pattern depend surface reflections of the object 100 as well as irregularities of the object 100, the above method is effective where the object 100 has a single surface reflectivity.

Figure 3:
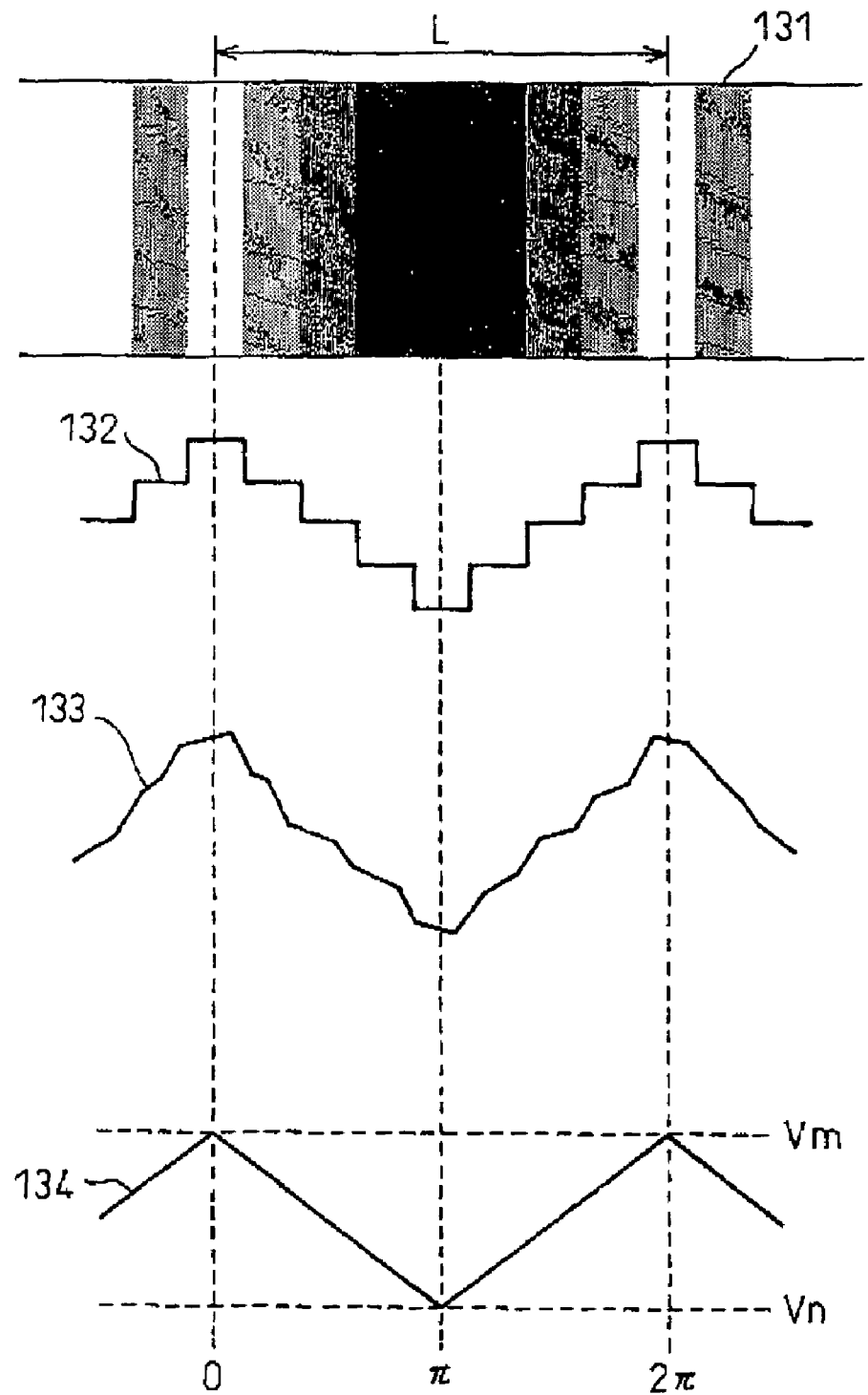
FIG. 3 is a diagram for indicating an intensity waveform of a grating pattern having a discrete intensity distribution and a linearly corrected intensity waveform.

The operation of the arithmetic processing unit 114 will be explained in detail using the intensity distribution waveform example of the deformed grating pattern shown in FIG. 3. It will be explained with the example of a deformed grating pattern having the triangular wave intensity distribution indicated by the waveform 122 of FIG. 2(b). Reference number 131 of FIG. 3 is the intensity distribution of the liquid crystal grating 111, and the intensity distribution in the period L of one cycle changes to linear with a step shape. The step shape is due to the electrodes of the liquid crystal grating 111 being formed discretely, a discrete intensity distribution drive signal being applied, and the number of gradations of the linear intensity distribution being kept to a small number. If the number of gradations is large, the signal of the liquid crystal driver for driving the liquid crystal grating 111 becomes complex and the number of projected grating patterns becomes less. The intensity distribution of the present embodiment is a case where there are eight gradations in one cycle of the grating pattern.

Waveform 132 of FIG. 3 is a waveform that exhibits changes in the intensity level of the triangular wave intensity distribution 131 indicated by gray gradations, intensities changing in a step form. When the grating pattern having this intensity distribution is projected onto to the object 100, image blurring occurs due to diffraction expansion, the characteristics of the projection optical system, and the like. Accordingly, the step width of the intensity distribution on the surface of the object 100 decreases, and the intensity distribution becomes somewhat a intensity distribution such as the waveform 133 of FIG. 3. The deformed grating pattern image detected by the image detection portion 104 is converted to a signal in which the intensity changes substantially smoothly in the smoothing arithmetic processing portion 115 using a method of moving averages. Further, a straight line approximation is performed on the smoothed signal in the linear distribution correction portion 116, to convert it to a signal that changes linearly. In other words, in the present embodiment, even if the number of gradations of the projected grating pattern is low, image processing is performed in a state where the number of gradations of the deformed grating pattern is high.

The waveform 134 of FIG. 3 is an example of a signal that has been straight line approximated by the linear distribution correction portion 116. Using the waveform 134, an intensity distribution that changes linearly is converted to a phase distribution that changes linearly. Here, the maximum intensity of the signal 134 is Vm and the minimum intensity is Vn. Where the surface reflectivity of the object 100 is constant, the intensities Vm and Vn are constant at any location. The intensities in each cycle are standardized by setting Vm to 1 and Vn to 0. For example, a straight line type proportional process is performed with the phase of the maximum intensity position as 0 and the phase of the minimum intensity position as π, so that the phase of any intensity position within one cycle can be made a value within the range of 0 to 2π. Consequently, phases that do not rely on the value of the intensity can be obtained.

By correcting discrete intensity distributions to intensity distributions that change linearly, phase calculation accuracy is increased compared to the case of prior art sine wave intensity distributions. Also, even if it is a grating pattern having an intensity distribution that changes in step form with coarse gradations, by converting it into a continuous straight line intensity distribution, it becomes equivalent to preparing a grating pattern having a high number of gradations, improving in-plane resolution. Further still, in the case of an object with the same surface reflectivity, the measurement time can be shortened by not performing phase shifting.

Figure 4A:
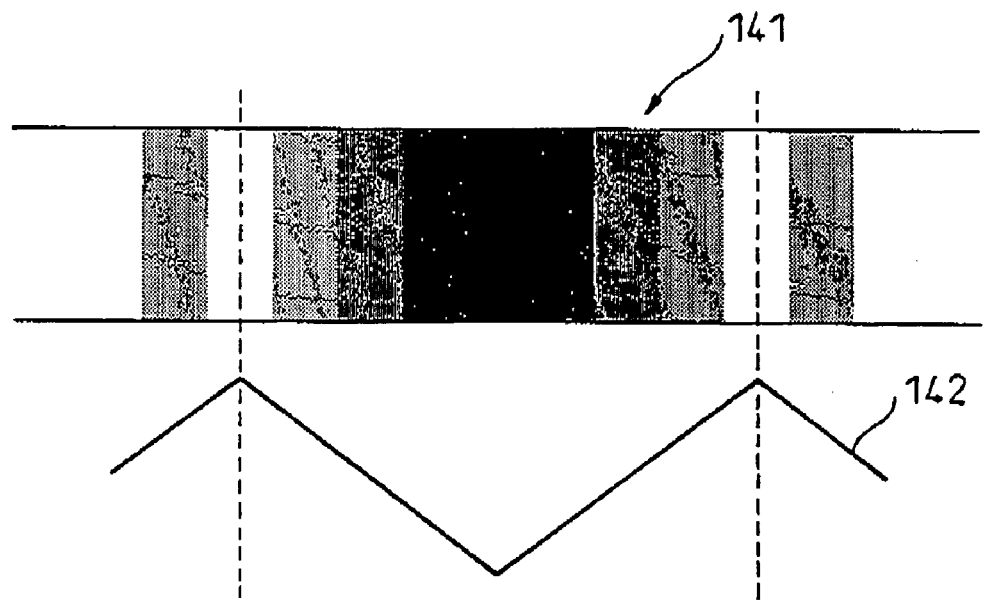
FIG. 4(a) and FIG. 4(b) are diagrams of grating pattern intensity waveforms.
Figure 4B:
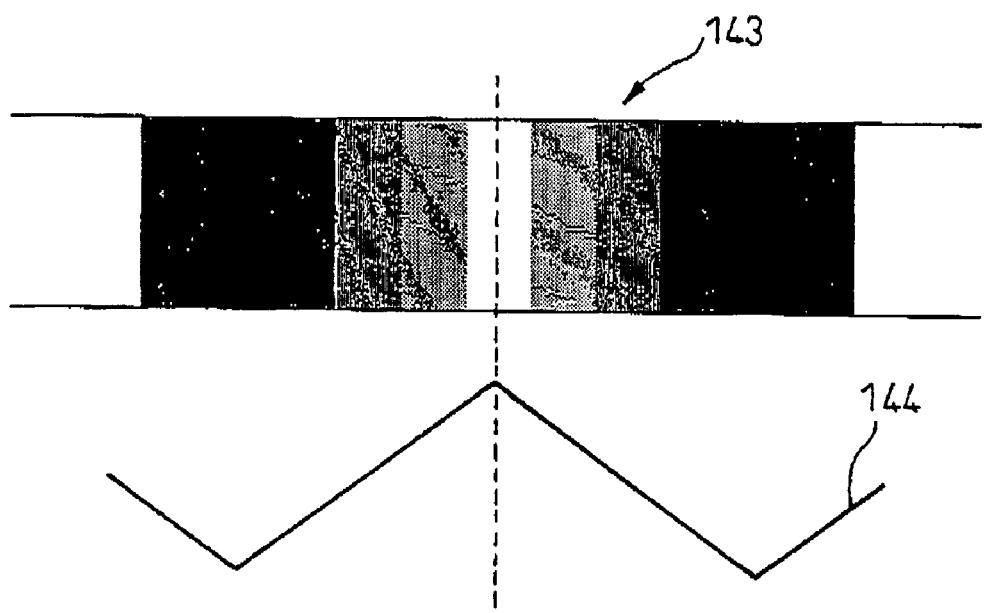

The operation in cases where the object 100 has a plurality of surface reflectivities will be explained. When the surface of the object 100 is constructed from a plurality of materials having different reflectivities, it cannot be distinguished whether the intensity fluctuations have occurred due to irregularities or fluctuations in the surface reflectivity with only one deformed grating pattern image. Thus, in the present invention, two types of grating patterns having different intensity distributions are projected onto the object 100. The intensity distribution 141 of FIG. 4(a) is identical to the intensity distribution 131 of FIG. 3, and is the intensity distribution of a first grating pattern whose intensity changes in a step form and linearly. The waveform 142, as explained by FIG. 3, is a signal in which a first deformed grating pattern image is corrected to a linear intensity change. The intensity distribution 143 of FIG. 4(b) is the intensity distribution of a second grating pattern, whose phase has been shifted (inverted) by π with respect to the intensity distribution of the first grating pattern. The waveform 144, similarly to the waveform 142, is a signal in which a second deformed grating pattern image is corrected to a linear distribution.

Figure 5:
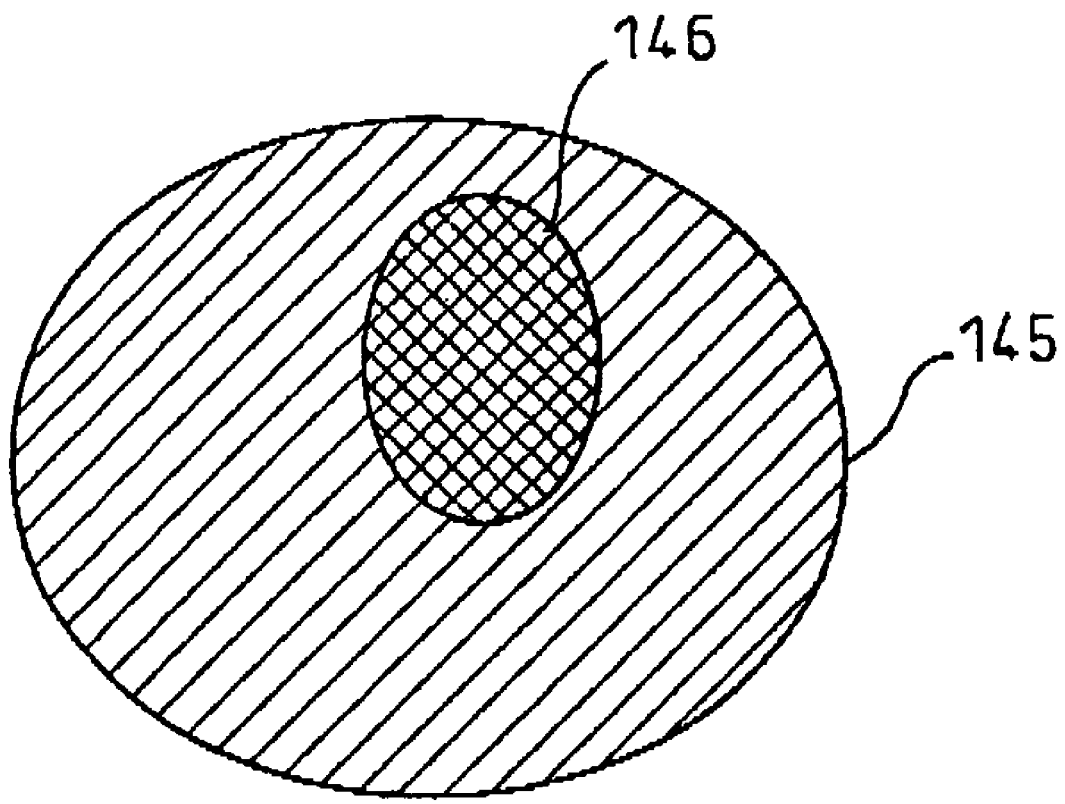
FIG. 5 is a diagram for indicating fluctuations of surface reflections.

FIG. 5 is the distribution of the surface reflectivity of the object 100, the surface reflectivity differing between an area 145 and an area 146. In the case of the present embodiment, the first grating pattern and second grating pattern having the same pitch but whose intensity distributions are inverse are each projected sequentially onto the object 100, and a first deformed grating pattern and second deformed grating pattern whose phases differ by π are sequentially detected. Comparing this with the prior art sine wave intensity distribution pattern projection method, in the present embodiment the point that fluctuations in the surface reflection state of the object can be determined from fluctuations in the combined intensity distributions of the two types of deformed grating patterns, and the point that the boundary positions where the reflectivity changes can be detected, differ from the prior art.

Figure 6:
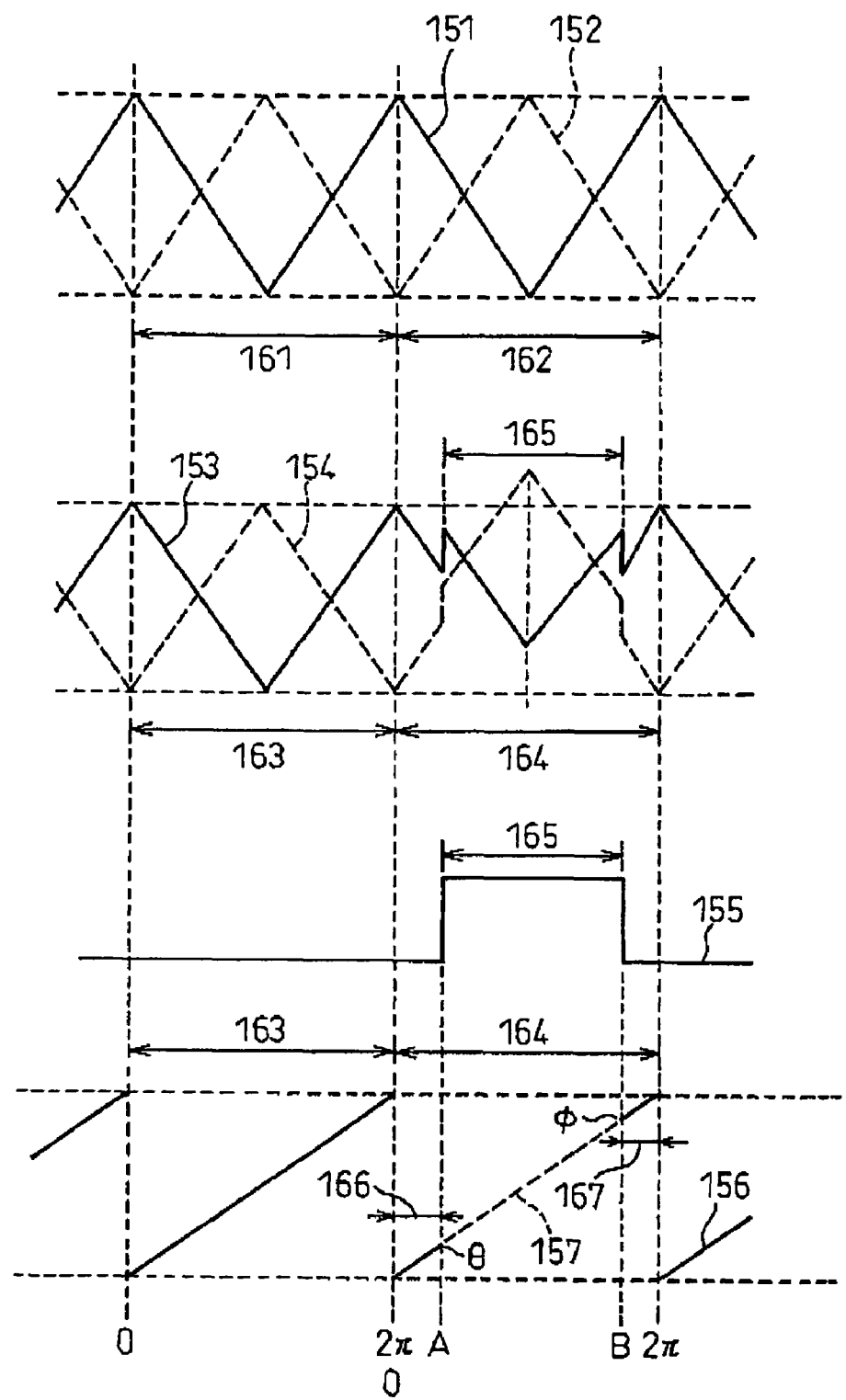
FIG. 6 is a diagram for explaining intensity changes and phase conversion of a deformed grating pattern when surface reflectivity fluctuates.

Using FIG. 6, a detailed operation where the two types of grating pattern are projected will be explained. The waveform 151 indicated by the solid line in FIG. 6 is a first deformed grating pattern intensity signal, the waveform 152 indicated by the broken line is a second deformed grating pattern intensity signal. In the present embodiment, the intensity fluctuations of the two deformed grating patterns are compared to detect fluctuations in the reflection state of the surface. The waveforms 151 and 152 both have the same maximum intensity and minimum intensity and both have intensities that change linearly, in the single cycle intervals 161 and 162. Further, in the single cycle intervals 161 and 162 the intensity sum of the two signals is constant. As a result, the reflectivity of the surface is determined to be the same in these intervals. Thus, standardization and proportional processing of the intensities shown in FIG. 3 are performed on either one of the signals of the waveforms 151 and 152, to convert it to phase that changes linearly.

The solid line waveform 153 and the broken line waveform 154 are the linear intensity signals of the first deformed grating pattern and the second deformed grating pattern. In the present embodiment the signal intensities differ in the single cycle intervals 163 and 164. In the interval 163 the intensities change linearly across the entire cycle, the maximum intensities and minimum intensities are the same as those of the interval 161 described above, and the sum of the intensities is constant. However, in the area of the interval 165 in interval 164 the intensities change discontinuously and the values of the maximum intensities and minimum intensities differ from those of the interval 163. The waveform 155 is the change in the sum of the intensities of the two waveforms 153 and 154, and the sum of the intensities change discontinuously at the boundary positions of the interval 165. Thus, it is determined that the reflection state of the surface has changed in the interval 165. In the present embodiment the reflectivity of the interval 165 is higher than the reflectivity of the interval 163.

The waveform 156 is a phase distribution that changes linearly. The waveform 156 is a phase that changes within a range of from 0 to 2π in one cycle, converted from the intensity distribution of either one of the first deformed grating pattern and the second deformed grating pattern by the method described above. As the reflectivity in the interval 163 is constant, the intensity is converted to a phase by proportional processing. However, as the reflectivity in part of the cycle 164 differs for an interval, the intensity cannot be converted to a phase by simple proportional processing. Thus, in the intervals 166 and 167 (corresponding to the first phase) within the interval 164, the intensity is converted to the first phase (o to θ and φ to 2π) indicated by the solid line. In the interval 165 (corresponding to the second phase) within interval 164, proportional processing is performed on the intensity to convert it to a second phase (θ to φ). Then, at the positions where the intensity is discontinuous (A and B in FIG. 6), the first phase and the second phase are smoothly connected. By this means, the second phase is arranged at the position indicated by the broken line (157 in FIG. 6). As described above, by comparing the intensities of the two deformed grating patterns to detect fluctuations in the surface reflectivity, the phases are detected according to irregularities only, without being influenced by intensity fluctuations due to surface reflections.

In the present embodiment, because it is permissible to project only two grating patterns having inverse intensity distributions, the number of phase shifts can be low, and the measurement time is shorter than the case of the prior art phase shift. From the above, in the present invention, a single grating pattern is projected where the surface of the object is the same reflective materials, and where the reflective materials differ, the grating patterns to be projected are selected according to the reflection state of the surface so that only two grating patterns are projected.

Next, the structure of the liquid crystal grating that prepares the grating pattern will be described. The liquid crystal grating 111 according to the present invention has a striped electrode structure and is driven by a static type drive signal. The reference number 170 of FIG. 7 indicates an example of the stripe electrode structure. The stripe electrodes 170 are constructed from N number of pixels 171, 172, . . . that are continuous in the vertical direction and discretely independent at a constant pitch in the horizontal direction. At this time, with regard to the width of the pixels in the horizontal direction, these have a structure wherein the gaps between the pixels are made narrow to increase the efficiency of light use (high aperture rate). As a liquid crystal grating, a single common electrode having the same potential over its entirety is formed on a glass substrate on the side opposite the glass on which the stripe electrodes are formed. Also, color filters such as those used for television displays and the like are removed and a monochromatic grating pattern is projected.

Where one cycle of the grating pattern has n number of intensity elements (n=8 in row 141 of FIG. 4(a)), and each intensity element is formed from m number of stripe electrodes, the number of grating patterns is N/(n×m). In the present invention a result the same as one with a high number of gradations is obtained by the smoothing process and linear correction, even when the number of linear gradations is not high. As a result, when deciding the number of intensity elements of one cycle, m is set low where the number of grating patterns is increased. Alternatively, where the number of grating patterns is low, m can be set high.

In the case of a liquid crystal grating having a TN structure, the light transmittance characteristic of the liquid crystal is determined according to the effective voltage applied between the common electrode and stripe electrodes. Thus, the drive signal is prepared from the linear intensity data prepared by the linear intensity distribution preparation unit 113 so that an effective voltage value corresponding to the linear intensity can be obtained. Because the electrode structure of the liquid crystal grating of the present invention has one common electrode opposite the stripe electrodes, a static type drive system can be applied. The liquid crystal drive signal when static driving is performed, it is a rectangular wave signal having two intensity levels. The effective voltage is changed by changes to the phase of the signal applied to the stripe electrodes with respect to a common signal applied to the common electrode. Due to the static drive driving each of the individual stripe electrodes, an arbitrary voltage can be applied to each electrode and the drive margin limit of the liquid crystal is small.

Figure 8:
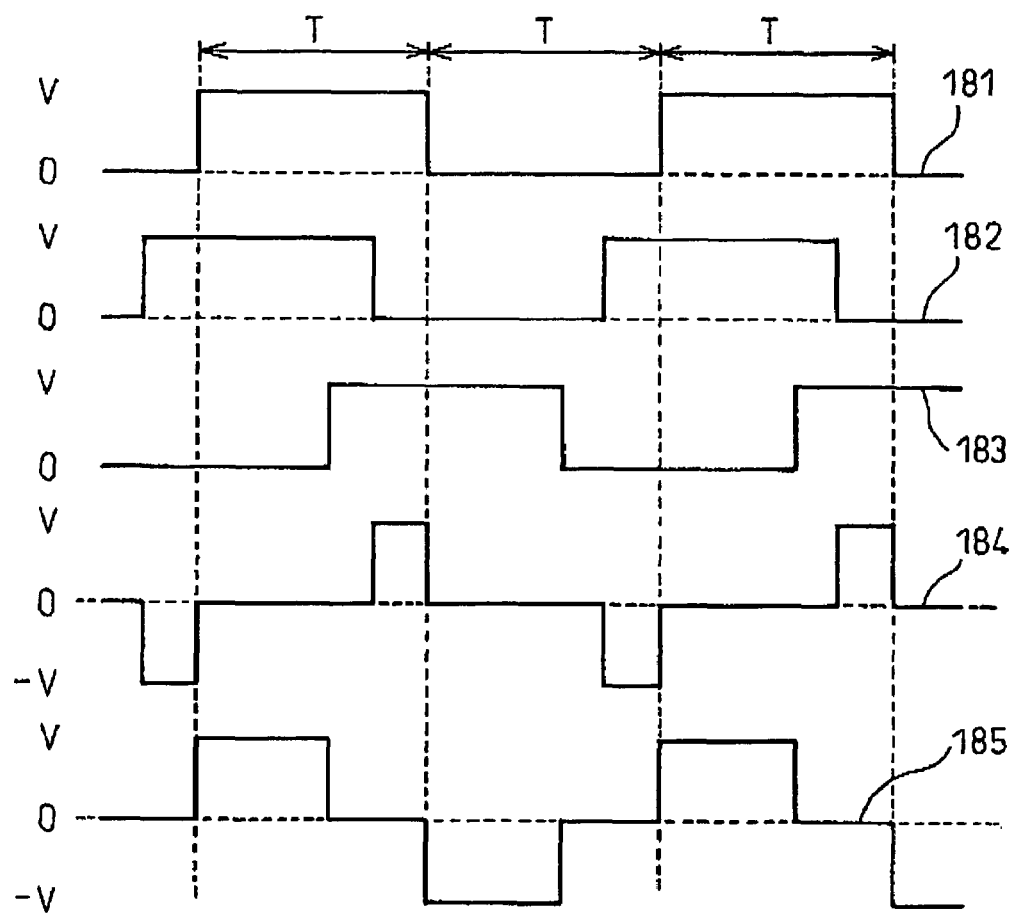
FIG. 8 is a diagram for explaining a signal waveform for driving the liquid crystal grating.

FIG. 8 shows an example of a liquid crystal drive signal waveform when a linear intensity distribution is realized. The signal 181 is a common signal applied to the common electrode, and is a rectangular wave signal in which one cycle has intensity levels (0 to V) of values 2T and 2, and the duty ratio is 50% (the H level and L level intervals are equal). Signals 182 and 183 are rectangular signals both applied to the stripe electrodes, have the same cycle, duty ratio and voltage levels as the common signal 181, and different phases to the common electrode 181. Signal 182 has a small phase difference to the signal 181, while the signal 183 has a large phase difference to the signal 181. Comparing signal 182 and signal 181, the interval during which they both have a common voltage within one cycle is long. Accordingly, as can be understood from signal 184, where both have the same voltage, the voltage applied between the liquid crystals is 0 and overall the effective voltage becomes small. In this manner, the linear distribution intensity can be decreased. With respect to this, comparing signal 183 and signal 181, the interval during which both have a common voltage in one cycle is short. Consequently, overall, the effective voltage is large and the linear distribution intensity can be increased.

Signal 184 and signal 185 are between electrode voltage signals, applied between the electrodes facing the liquid crystals. Signals 184 and 185 correspond respectively to the drive signals 182 and 183. The effective voltage, because it is determined according to a phase difference of signals applied to the common electrode and stripe electrodes, modulates the phase with respect to the common electrode 52 according to the strength of the linear intensity. In other words, the pulse width of the stripe electrode drive signal, which coincides with the potential of the common signal, is modulated, and the linear intensity is set freely. In this manner, the signal 182 becomes a signal set to a small linear intensity, and signal 183 becomes a signal set to a large linear intensity. By applying the static drive method to the above stripe electrodes, a high contrast, low noise grating pattern can be prepared. At this time, a signal whose phase is changed with respect to the signal 181 is prepared so that the intensity of the linear distribution is changed in proportion. Also, where a constant voltage is applied, the effective voltage can be adjusted by adjusting the width in one cycle.

(Second Embodiment)

In the grating pattern projection apparatus according to a second embodiment, a liquid crystal grating formed by liquid crystal elements is used so that the pitch length and intensity distribution of the projected grating pattern are freely adjustable. The intensity distribution of the grating pattern projected onto the object is set so that it has a linear intensity distribution within one cycle of the grating pattern. The grating pattern, in particular, is preferably set so that the width of an area where the intensity increases linearly and the width of an area where it decreases linearly are equal, the amplitudes of each of the intensity increase and decrease area are also equal, and it has a symmetrical triangular wave intensity distribution. The single phase linear signal that creates the linear intensity distribution grating pattern is a linear signal whose voltage is discrete and stepped within one cycle of the grating pattern, a signal that changes symmetrically every half cycle, and a signal for driving the liquid crystal grating. The voltage step width is set according to the number of gradations that dictate the fineness of the intensity distribution, by the single phase linear signal. When the gradations are to be increased and the intensity of the grating pattern changed in small increments, the voltage step width is set small.

Even when the voltage of the liquid crystal drive signal is a discrete signal that changes in steps, the intensity distribution of the grating pattern projected by the liquid crystal grating makes a substantially continuous linear intensity distribution pattern due to a diffraction effect caused by the grating pattern, an image blurring effect on the grating edge portions caused by the optical system, or the like. Generally, the higher the gradation, the more the surface density of the grating pattern is improved. However, the grating pattern having the linear intensity distribution according to the present invention can be processed as a grating pattern of substantially the same quality as a grating pattern having high gradation, even if the gradation is not set high, by giving it a linear distribution and using the image processing method to be described below. Therefore, a drive signal having a linear distribution of approximately eight gradations for example can be prepared. The grating pattern is projected onto the object once only, a deformed grating pattern image of one phase only is detected and stored, and a three dimensional shape is calculated by processing the single phase image signal.

The arithmetic process is performed by detecting peak intensities (maximum intensity and minimum intensity) of each cycle of the single phase image signal and pixel positions where the peak intensities are obtained, and detecting fluctuations in the rate of intensity change. Further, the surface reflection state of the object is detected from the peak intensities, and changes in the irregular shape of the object are detected from the rate of intensity change. In particular, the rate of intensity change is an important value that corresponds to changes in fine irregularities in the object existing within one cycle of the deformed grating pattern.

Detection of the peak intensities and rate of intensity change is not detection by intensities between two continuous pixels, but detection from intensities between pixels separated by a preset step only (stepped pixels interval). The rate of intensity change is detected from a difference value in the intensities of stepped pixel intervals. By detecting at stepped pixel intervals, simplification and acceleration of the processing can be realized. As the basic intensity distribution is linear, processing of stepped pixel intervals is possible. where the rate of intensity change in one cycle fluctuates, the rate of intensity change is discretely separated into segments. As a result, a plurality of slice intensity levels are provided in the rate of intensity change, the detected rate of intensity change and slice intensity levels are compared, and the rates of intensity change in the regions of the set slice intensity levels are separated. At this time, the width of the region where the rate of intensity change changes is used in the determination that takes place when they are separated. Accordingly, separation is not performed when the rate of intensity change fluctuates in small widths. By means of the above method, the rate of intensity change separated into a number of regions, and image positions where fluctuations in the rate of intensity change occur, are stored.

The intensity distribution of the deformed grating pattern fluctuates due to irregularities in the object and surface reflectivity fluctuations. Here, because whether fluctuations in the intensity distribution of the single phase image signal are irregularities or fluctuations in reflectivity is distinguished, fluctuations in the peak intensities of the single phase image signal are detected. Where the peak intensities in each cycle of the single phase image signal are constant, the reflectivity within that range is determined to be constant and, if the peak intensities fluctuate, the reflectivity in the vicinity of positions where they change is determined to have fluctuated. Where the peak intensities are constant, the phase distribution for measuring the irregularities of the object is calculated based on rate of intensity change data. Where the peak intensities fluctuate, the phase distribution for measuring the irregularities of the object is calculated based on both peak intensity and rate of intensity change data.

As the intensity distribution of the single phase image signal changes if the irregularities of the object change, the irregularities of the object are detected from fluctuations in the rate of intensity change. If the intensity distribution of the deformed grating pattern is a symmetrical triangular waveform distribution, the rate of intensity change of the single phase image signal is a positive/negative equal value. Thus, the rate of intensity change appears as an absolute value. If the absolute value of the rate of intensity change in one cycle of the single phase image signal is constant, because the signal intensity during that interval undergoes a constant linear change, the irregularities of the object have the same constant gradient. If the absolute value of the rate of intensity change in one cycle fluctuates, the gradient of irregularities of the object during that interval change.

The irregular shape of the object is calculated from the phase distribution according to the rate of intensity change of the single phase image signal. As the rate of intensity change changes not only due to the irregular shape but also due to reflectivity fluctuations in the object, fluctuations in rate of intensity change due to reflectivity fluctuations are cancelled out, and rates of intensity change due to irregularities are extracted to calculate phase distribution. For example, the rate of intensity change at a position where the reflectivity changes, changes stepwise in widths of a few pixels. The rate of intensity change that occurs in this case is canceled as a type of noise. If the rate of intensity change in one cycle of the single phase image signal is constant, it is converted to a phase that changes linearly with a uniform gradient across the entire cycle. If the rate of intensity change in one cycle of the single phase image signal fluctuates, a phase distribution that changes linearly in each range separated according to the size of the fluctuation is calculated.

If the rate of intensity change in one cycle of the single phase image signal is constant, the phase difference between maximum intensities or between minimum intensities of the single phase image signal within that cycle is standardized to $2\pi$, a phase is allocated to each pixel position from a proportional relationship between a standard number of pixels in maximum intensity gaps or minimum intensity gaps and each pixel position, and phases that change linearly within one cycle are calculated. In other words, the phases are not calculated from the ratio of the intensity of each pixel position to the peak intensities, but rather the pixel positions in one cycle are converted directly to linear phases. Here too, the basic shape of the intensity distribution can be linear, and simplification and acceleration of the arithmetic processing can be realized. At this time, if the single phase image signal is a symmetrical triangular wave signal, the phase difference at intervals of half a cycle in regions where the intensity increases and regions where it decreases can be standardized to $\pi$ and allocated to phases that change linearly with each range, and the phases can be connected later.

If the rate of intensity change in one cycle of the single phase image signal changes, the phase difference between maximum intensities or between minimum intensities of the single phase image signal within that cycle is standardized to $2\pi$, and a phase is allocated to each pixel position within each region according to a proportional relationship between a standard number of pixels in maximum intensity gaps or minimum intensity gaps and each pixel position, and the slice intensity level of each region. Next, the phase of each region is connected at boundary positions where the rate of intensity change changes, and a phase distribution in which gradients in one cycle differ but change linearly within each region is calculated.

Figure 9:
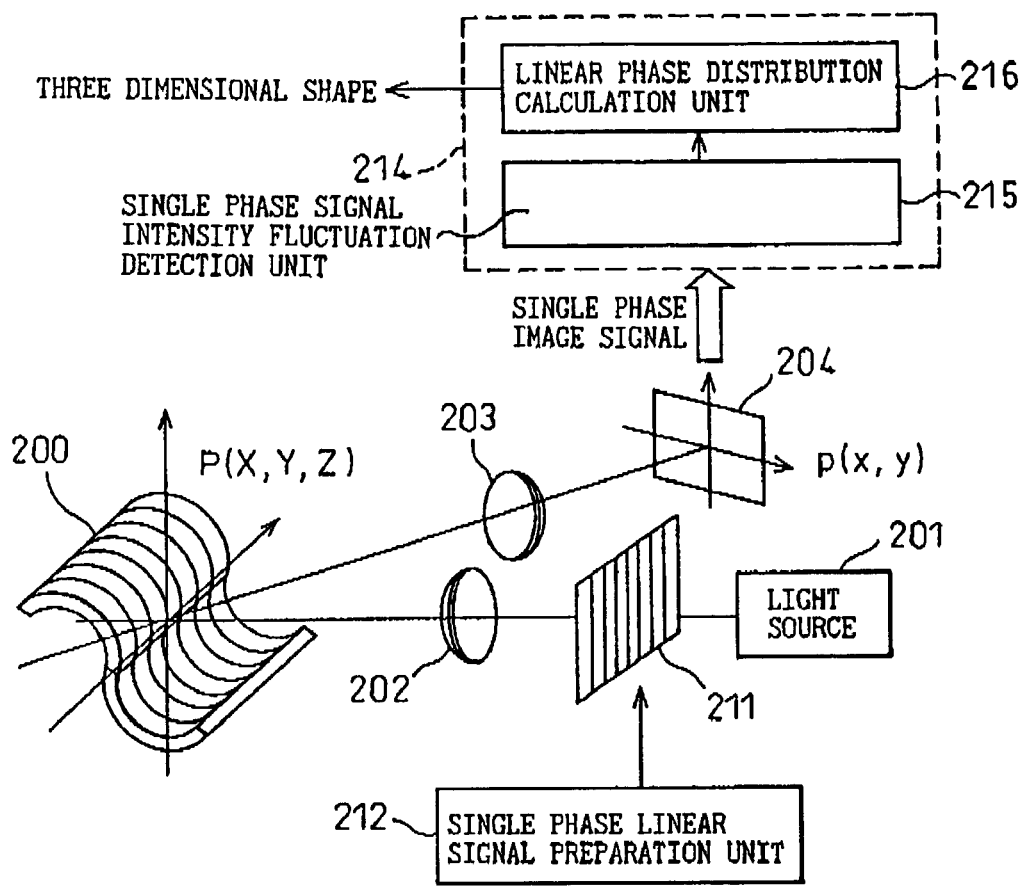
FIG. 9 is a diagram for explaining the structure and operation of a second embodiment of the present invention.

Hereafter, the second embodiment according to the present invention will be explained in detail using the drawings. FIG. 9 shows an outline of a grating pattern projection apparatus using a liquid crystal grating. A light source 201 is constructed from a white light source for lighting such as a halogen lamp or the like, and emits a white light onto a liquid crystal grating 211. A single phase linear signal preparation unit 212 prepares a single phase linear signal whose intensity during one cycle changes linearly and applies it to the liquid crystal grating 211. The liquid crystal grating 211 creates a grating pattern having a linear intensity distribution according to the single phase linear signal, and projects it through a projecting lens 202 onto the object 200 whose three dimensional shape is to be measured.

Figure 10:
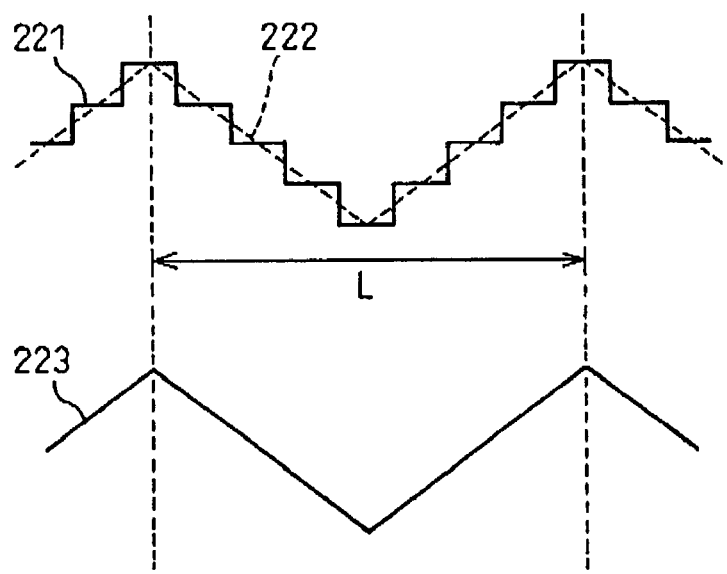
FIG. 10 is a diagram for indicating examples of linear intensity distribution waveforms.

FIG. 10 shows a waveform example having a linear intensity distribution. The waveform 221 is the waveform of a single phase linear signal for driving the liquid crystal grating 211, and the waveform 223 is an intensity distribution waveform of a grating pattern having a linear intensity distribution. Th single phase linear signal 221 is a signal whose voltage is discrete, which has a stepped waveform, and which changes in linear steps, and the interval of one cycle of which is L. The liquid crystal grating 211 has a structure in which the pixels are separated and independent, and due to reasons such as limitations when preparing the drive signal and the like, is driven by voltage that changes stepwise. At this time, the step voltage and the number of liquid crystal pixels to which the same voltage is applied are set according to the size and number of liquid crystal pixels, the number of grating patterns projected, the intensity gradation, and the like. The example of FIG. 10 is a five gradation signal having five levels between the minimum intensity and the maximum intensity.

The waveform 222 indicated by the dotted line in FIG. 10 is a triangular wave signal that is symmetrical in the interval of once cycle, has had its intensity changed to link the central portions of the stepped wave, in which the widths of the intensity increase regions and the intensity decrease regions are equal, and which has the same voltage amplitude as the waveform 221. The waveform 223 is the intensity distribution waveform of the grating pattern projected onto the object 200 and has a symmetrical triangular intensity distribution corresponding to the waveform 222. Even if the voltage of the single phase linear signal is a step shape, the projected grating pattern has a distribution whose intensity changes substantially continuously. This is because a blurring effect occurs in the edge portions of the liquid crystal grating 211 due to diffraction or the like caused by the shortness of the grating pitch of the liquid crystal grating 211. Although 32 gradations or more were required in the prior art sine wave intensity distribution, an intensity distribution having acceptable linearity can be attained even when the linear intensity distribution is only on the order of eight gradations, and the drive signal is easily prepared compared to the prior art sine wave.

The grating pattern projected onto the object 200 distorts according to the irregularities in the surface of the object 200, and a two dimensional image of the deformed grating pattern is detected by a single phase image detection unit 204 comprising a CCD camera or the like, via a pickup lens 203 from a direction different from the projection direction, and stored. The present invention is a structure that image processes by projecting one (single phase) grating pattern, and detecting one (single phase) deformed grating pattern only. The basic shape of the intensity distribution of the single phase deformed grating pattern is a linear intensity distribution corresponding to the projected grating pattern. The single phase image signal whose intensity changes linearly and which was detected by the single phase image detection portion 204 is image processed by the single phase linear image processing portion 214 and the three dimensional shape of the object 200 is calculated.

The single phase linear image processing unit 214 is constructed from a single phase signal intensity fluctuation detection unit 215 for detecting fluctuations in the intensity of the single phase image signal, and a linear phase distribution calculation unit 216 for calculating a linear phase distribution according to the detection result of the intensity fluctuation of the single phase signal. The intensity of the single phase image signal fluctuates according to changes in the irregularities of the surface and the surface reflectivity of the object 200. Fluctuations are detected from the symmetrical linear distribution which is the basic intensity distribution of the single phase image signal, the phase distribution corresponding to these fluctuations are calculated, and the irregular shapes are measured. Accordingly, in the present invention, detection of the intensity fluctuations of the linear single phase image signal is an important requisite.

The single phase signal intensity fluctuation detection unit 215 detects the sizes of peak intensities of the signal and the pixel positions which are the peak intensities in each cycle of the single phase image signal, and detects fluctuations in the rate of intensity change occurring in each cycle of the single phase image signal. The sizes and positions of the peak intensities are detected from the intensities between step pixels, and the rate of intensity change is detected from the difference in intensities between step pixels. If the rate of intensity change within one cycle is constant, the intensity of the single phase image signal in one cycle changes with a constant gradient, and the irregularities are constant. If the rate of intensity change in one cycle fluctuates, the gradient of the intensity of the single phase image signal in one cycle changes, and the irregularities fluctuate. At this time, a distinction of reflectivity fluctuation and irregularity fluctuation is performed according to pixel widths where the rate of intensity change occurs.

The linear phase distribution calculation unit 216 calculates the phase distribution that changes linearly in each cycle of the single phase image signal based on the intensity fluctuation detection result of the single phase signal intensity fluctuation detection unit 215. If the rate of intensity change within one cycle is constant, a phase distribution that changes linearly with a uniform gradient across the entire cycle is calculated. At this time, the interval of maximum intensity and the interval of minimum intensity of the single phase image signal is taken as one cycle, and the phase difference of a standard pixel interval is standardized to $2\pi$. Also, the phase determined by the proportional relationship between the number of pixels in a standard pixel interval and each pixel position is allocated to each pixel position, to calculate a phase that changes linearly as a whole.

If the rate of intensity change in one cycle fluctuates, a number of slice intensity levels are provided with respect to the rate of intensity change. Then, the detected rate of intensity change is compared to the set slice intensity level, is divided into a number of discrete rate of intensity change regions, and detected together with the pixel positions where these region change. At this time, separation is not performed if the pixel width in the regions where the rate of intensity change changes is small. The rate of intensity change within each of the regions is assumed to be constant and a phase distribution that changes linearly in each region is calculated. In this case too, the phase difference of a standard pixel interval in one cycle of the single phase image signal is standardized to $2\pi$, and a phase distribution that changes linearly within the limits of the regions is calculated according to the proportional relationship between the standard number of pixels and pixel positions within the regions, and the size of the rate of intensity change. Next, the phases in each region at the boundary positions where the rate of intensity change changes are connected, and a phase distribution is calculated that changes linearly in each of the segments of one cycle.

Figure 11:
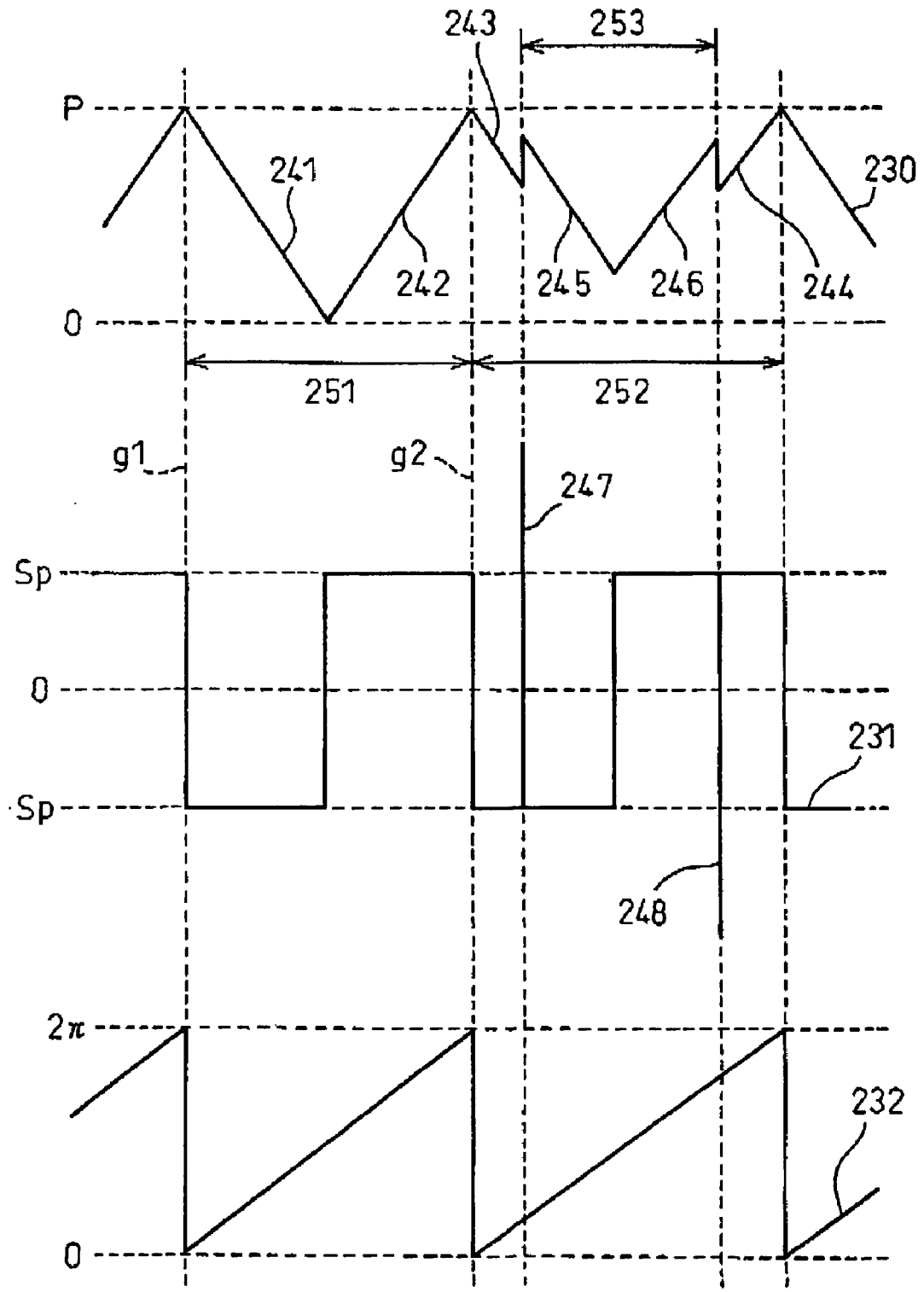
FIG. 11 is a diagram for indicating examples for explaining a phase distribution calculation method.

The specific operations of the single phase signal intensity fluctuation detection unit 215 and the linear phase distribution calculation unit 216 will be explained using the various waveform examples shown in FIG. 11. The waveform 230 of FIG. 11 is an example of a single phase image signal waveform, waveform 231 is an example of a rate of intensity change waveform, and waveform 232 is an example of a phase distribution waveform. In the present invention, fluctuations in the intensity level of the single phase image signal 230 and the rate of intensity change waveform 231 are calculated, and the phase distribution waveform 232 is calculated from these data.

The single phase image signal 230 of FIG. 11 has a half cycle intensity fall interval 241 and a half cycle intensity rise interval 242 in the interval 251 of one cycle, both the intervals 241 and 242 having their intensities changing linearly at a uniform gradient at a value P where the amplitude is constant. Within the interval 251 the reflectivity of the object 200 is determined to be constant, and pixel positions g1 and g2 of maximum intensity taken as the standard positions of one cycle are detected and stored. Also, if the intensity of the single phase image signal 230 fluctuates minutely due to noise and the like, after being converted to a signal whose intensity changes smoothly by being smoothing processed or the like, it can be subjected to signal processing.

The rate of intensity change waveform 231 of FIG. 11, in the fall interval 241 and rise interval 242 of the one cycle interval 251, has a constant size value whose size is equal but whose sign differs (−Sp and Sp). To express this as an absolute value, in the one cycle interval 251, the rate of intensity change is constant. Accordingly, the reflectivity of the object 200 in this interval is constant and irregularities are also constant.

The phase distribution waveform 232 of FIG. 11, due to the absolute value of the rate of intensity change being constant between the pixel g1 and pixel g2 of the one cycle interval 251, has a phase in the interval 251 which changes continuously and linearly from 0 to $2\pi$. Taking both the pixel g1 and the pixel g2 of the interval 251 as standard pixels, the phases at the position of the pixel g1 and the position of the pixel g2 are respectively 0 and $2\pi$. Thus, the phase of each pixel position can be calculated from the proportional relationship between the number of pixels $\Delta g$ (=g2−g1) between the standard pixels and each pixel position. For example, the phase $\phi$ of a pixel position gn in the interval 251 is calculated by $\phi = 2\pi(gn-g1)/\Delta g$. In other words, the phase of each pixel position is not calculated from the intensity of each pixel position with respect to the amplitude P of the single phase image signal 230, but rather the phase of each pixel position is calculated from the proportional relationship of the number of pixels and the pixel positions. Using this method, it is possible for the intensity of a single phase image signal to change linearly, and the phase calculation process is easy.

In the next one cycle interval 252, the intensity changes discontinuously in the interval 253 therein, and the minimum intensity also changes. As a result, it is determined that the reflectivity of the object 200 is changing within the interval 253. The rate of intensity change waveform 231 in this case changes discontinuously and stepwise at the positions 247 and 248. Where the rate of intensity change changes stepwise, a determination that the reflectivity only has changed is performed. Accordingly, even if fluctuations occur in the rate of intensity change, they are not compared to a slice intensity level and are separated into rate of intensity change regions.

The rate of intensity change of the intensity fall interval 245 and intensity rise interval 246 of the interval 253 is a value the same as in the case of the interval 251. Also, the rate of intensity change in intervals 243 and 244 on both sides of the interval 253 within the one cycle interval 252 is a value equal to the rate of intensity change in the interval 251. In this case, the entirety of the interval 252 is the same irregularity shape, and the same irregularity shape as the interval 251. In the interval 252, as in the interval 251, the phase of each pixel position is calculated from the proportional relationship between the standard number of pixels in the one cycle interval 252 and each pixel position. Consequently, as an entire cycle, a phase that changes continuously from 0 to $2\pi$ is calculated. In this way, even if a stepwise fluctuation occurs in the rate of intensity change, the phase distribution can be calculated without receiving that effect.

Figure 12:
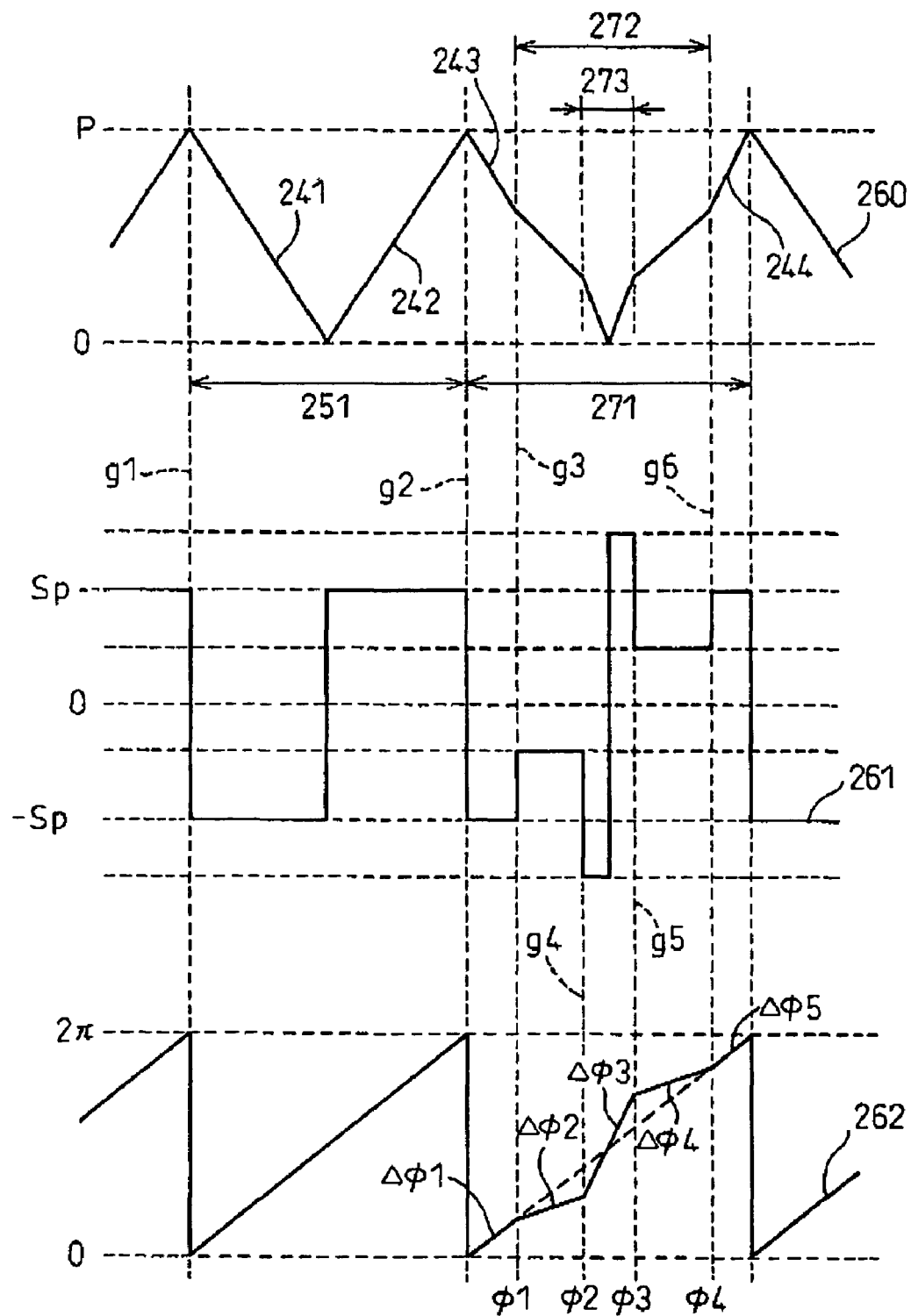
FIG. 12 is a diagram for indicating other examples for explaining a phase distribution calculation method.

Other operations of the single phase signal intensity fluctuation detection unit 215 and the linear phase distribution calculation unit 216 will be explained using the other waveform examples shown in FIG. 12. The waveform 260 of FIG. 12 is a waveform example of a single phase image signal, the waveform 261 is a waveform example of a rate of intensity change, and the waveform 262 is a waveform example of a phase distribution. Here, a case is shown wherein, although the reflectivity in one cycle is constant, the rate of intensity change fluctuates.

In the waveform 260 of the single phase image signal of FIG. 12, the interval 251 of one cycle, is the same as in the case of FIG. 11, and the rate of intensity change in that interval is constant. In the interval 271, as indicated by the waveform 261 of the rate of intensity change, the rate of intensity change changes in the interval 272 within the cycle, and the rate of intensity change changes further in the interval 273 therewithin. Since the peak intensity of the single phase image signal in the interval 271 in one cycle is a constant value P, the reflectivity in that interval is constant and the irregular shape changes.

In the interval 273 within the interval 272, the rate of intensity change is greater than in the interval 251, and in the other intervals within the interval 272, the rate of intensity change is less than in the interval 251. Also, the rate of intensity change in the other intervals 243 and 244 within the interval 271 is the same as in interval 251. Further, several slice intensity levels of the rate of intensity change are provided. In addition, the rate of intensity change obtained from the single phase image signal and the slice intensity levels are compared, and the rate of intensity change is separated into segments having discrete slice intensity levels. The waveform 261 of the rate of intensity change is a waveform that indicates a rate of intensity change separated into segments of discrete slice intensity levels. Also, in interval 271, pixel positions g3, g4, g5 and g6 where the segments change are detected and stored. When the rate of intensity change is large, the change in irregularities also appears large, and when the rate of intensity change is small, the change in irregularities also appears small. Also, in the present embodiment, because the reflectivity in interval 271 is constant and the pixel width (region) in each segment is broad, separation is performed for each segment.

The waveform 262 of phase distribution in interval 271 is a phase calculated distribution that changes linearly in each segment. In this case too, as in the example described above, the phase of each pixel position is calculated from the proportional relationship between the standard number of pixels in one cycle interval and each pixel position. In this case, with respect to the proportionally distributed phases, the gradient of the phase change of each region is made different according to the size of the rate of intensity change. Where the rate of intensity change is large, the rate of change of the phase corresponds to large. Because this rate of intensity change is discretely classified, the gradient of the phase change is determined according to this classification.

In this manner the calculated phase widths of each region are taken as $\Delta\phi1$, $\Delta\phi2$, $\Delta\phi3$, $\Delta\phi4$ and $\Delta\phi5$, and continuity of the phases at the boundaries of each region is performed. In this way, as shown in the phase distribution waveform 262, the phases at each boundary are respectively $\phi1$, $\phi2$, $\phi3$ and $\phi4$, and phases that change linearly in each region from 0 to $2\pi$ over the entire cycle are calculated. In this case also, by detecting fluctuations of the rate of intensity change and the pixel positions that fluctuate, the phase distribution can be simply and precisely calculated.

Figure 13:
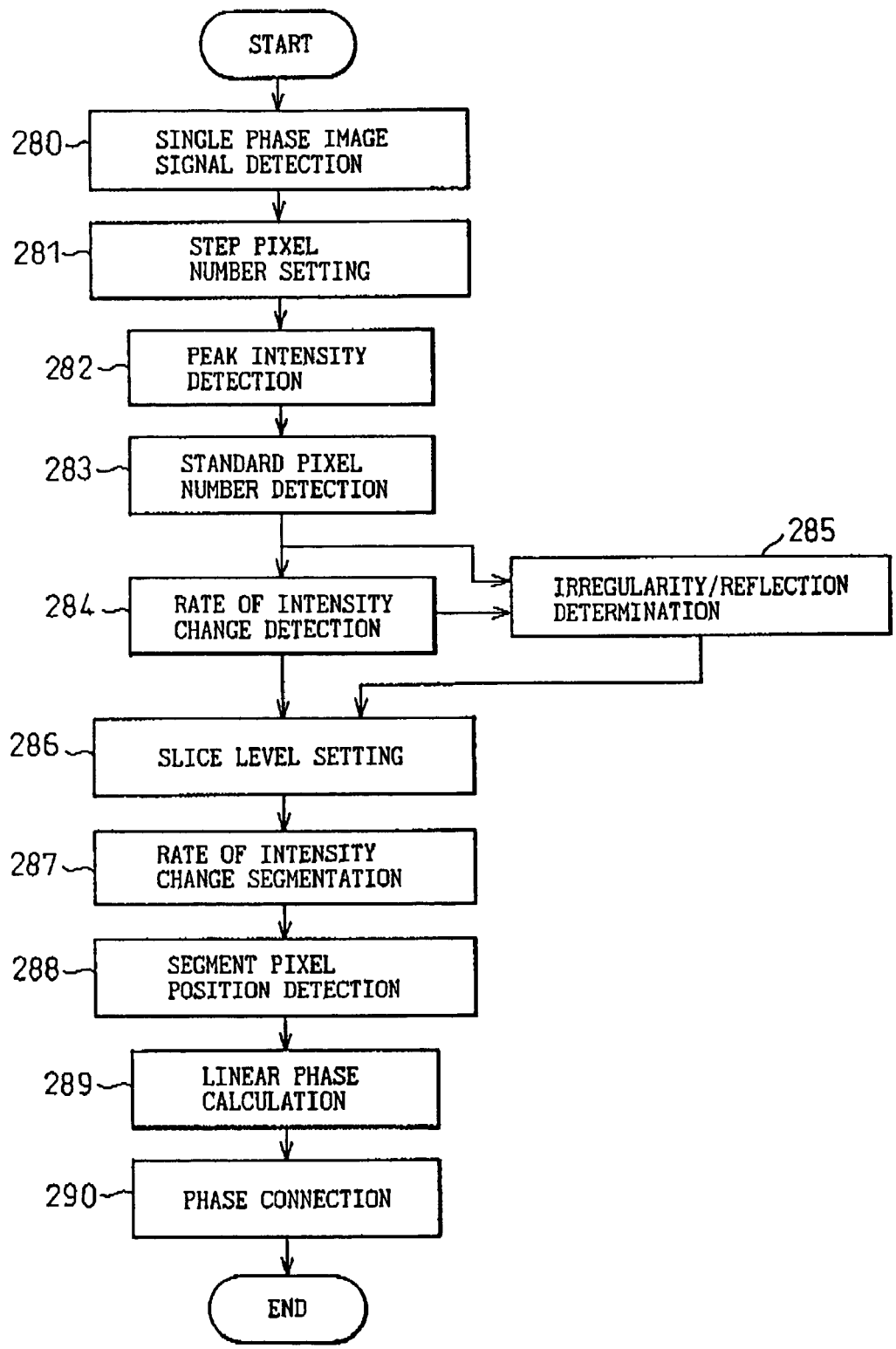
FIG. 13 is a flow chart for explaining the operation of the second embodiment of the present invention.

FIG. 13 shows a flow chart of the arithmetic process when calculating the phase distribution within one cycle of the single phase image signal according to the present invention. Step 280 performs detection and storage of a single phase image signal of the deformed grating pattern image. Step 281 sets a step pixel number for performing processing of the single phase image signal, and takes the intensity at pixel positions separated into five pixels, for example, as the subject to be processed. Step 282 detects a peak intensity (maximum intensity or minimum intensity) within one cycle of the single phase image signal and the pixel positions which are peak intensities. Step 283 detects and stores a standard number of pixels in one cycle of a maximum intensity interval or a minimum intensity interval detected in step 282. This standard number of pixels is a standard when performing the following phase calculation.

In the detection of the rate of intensity change in step 284, this is calculated from a difference value of the intensity between pixels which are the target. Step 285 determines the existence of irregularities and reflection fluctuations in one cycle, and determines this from data of both fluctuations of the peak intensities of step 282 and fluctuations in the rate of intensity change of step 284. Generally, if the peak intensity changes, the reflectivity changes, and if the rate of intensity change changes, the irregularity distribution changes. Also, where fluctuations of the rate of intensity change occur between stepwise narrow width pixels, it is determined that these are boundary positions where the reflectivity fluctuates. In the subsequent processing steps, only rates of intensity change due to irregularity fluctuations are extracted, according to the above determination result.

In step 286, the slice intensity levels, for separating the rate of intensity change into discrete segments, are set. Step 287 compares the slice intensity levels with the rate of intensity change detected in step 284, and separates the discrete rate of intensity change into segments. If the rate of intensity change does not fluctuate, the entire cycle is one segment. At this time, it is determined whether to separate the rate of intensity change according to the irregularity and reflectivity fluctuation determination result of step 285. For example, as indicated by 247 and 248 in FIG. 11, where the rate of intensity change changes stepwise in narrow widths, it is processed as a type of noise, and not separated. Step 288 the pixel positions of the boundaries of each segment are detected and stored.

In step 289, calculation of phases that change linearly in the region of each segment is performed. As the rate of intensity change in each region is constant, positions in those regions change uniformly to linear. Phase processing takes the phase difference of the interval of one cycle as $2\pi$. If the rate of intensity change in the interval of one period is constant, the phase of each pixel position can be calculated from the proportional relationship between the standard number of pixels in one cycle interval and each pixel position. If the rate of intensity change in the interval of one period fluctuates, the phase of each pixel position in each region is calculated. In other words, in each region, the phase of each pixel position is calculated from the proportional relationship between the number of pixels included in a region and each pixel position, using the phase change gradient that changes linearly with the region.

Step 290 is connection of the phases, and connects the phases calculated for each region at the boundary positions of each region. Accordingly, step 290, although there are kinks at the boundary positions of each region, calculates phase distributions that change linearly at different gradients across the entire cycle. Phase distributions of each cycle detected by the above procedure are converted to two dimensional phase distributions, and three dimensional shapes are calculated from the two dimensional phase distributions.

As clarified by the above explanation, the present invention projects onto an object a single phase grating pattern having a linear intensity distribution by driving a liquid crystal grating with a single phase linear signal, detects a only single phase deformed grating pattern image, and image processes a single phase image signal. In the image processing of the single phase image signal, in particular, fluctuations in a rate of intensity change are detected, a phase distribution the changes linearly according to the detected fluctuations is calculated, and a three dimensional shape is measured from the calculated phase distribution.

(Third Embodiment)

In the grating pattern projection apparatus according to a third embodiment, a liquid crystal grating formed by liquid crystal elements is used so that pitch length and intensity distribution of the projected grating pattern can be freely adjusted by electric signals. The intensity distribution of the projected grating pattern is an important requisite that determines measurement resolution measurement time and, in particular, gradations must be imparted on the intensity distribution in each cycle in order to increase resolution. Thus, the intensity distribution of the grating pattern is set to have a linear intensity distribution in each single cycle. In particular, this linear intensity distribution is preferably a symmetrical triangular waveform distribution in which the length and amplitude of a region where the intensity increases linearly and a region where the intensity decreases linearly are both equal.

In order to set a grating pattern having a linear intensity distribution, a linear distribution signal is prepared to drive the liquid crystal grating. At this time, the linear distribution signal is a signal in which an effective voltage for driving the liquid crystal grating is discrete and changes stepwise and linearly, and is set to a signal that changes symmetrically every half cycle of the grating pattern. The number of steps when the effective voltage changes stepwise corresponds to the number of gradations of the grating pattern intensity.

Although the effective voltage for driving the liquid crystal grating changes stepwise, the intensity distribution of the grating pattern projected from the liquid crystal grating is an intensity distribution pattern that changes substantially continuously and linearly. This is for the reasons of diffraction due to the minute electrodes of the liquid crystal grating and the image blurring effect at the edge portion of the grating due to the projection optical system. This improves the surface density of the grating pattern to the extent of a high intensity gradation in a sine wave or the like. However, a grating pattern having a linear intensity distribution is a grating pattern having the same quality as one with a high number of gradations and having a substantially continuous and linear intensity distribution, even if the number of gradations is not increased. As a result, even with a low number of gradations, such as eight or thereabouts for example, a highly precise linear intensity distribution can be attained.

The liquid crystal grating is driven by a linear distribution signal that generates an effective voltage that sets the liquid crystal grating with a linear intensity distribution, and a two dimensional image of the grating pattern projected onto an object is detected. At this time, due to a variety of causes, such as fluctuations in the surface reflectivity of the object and the detection gain of the CCD camera for detecting the deformed grating pattern, fluctuations in lighting intensity, fluctuations in drive signal levels, or the like, there are cases where a grating pattern image having a linear intensity distribution that has been modulated into a non-linear intensity distribution is detected. This non-linear characteristic occurs in particular in the vicinity of the maximum intensities and minimum intensities of the intensity distribution. The present invention detects the non-linear characteristic of the intensity distribution of the grating pattern and the position where the non-linear characteristic occurs, controls the drive effective voltage of the liquid crystal grating by changing the linear distribution signal according to the extent and position of the non-linear characteristic, and automatically corrects it to a linear intensity distribution grating pattern.

Due to this, prior to actual measurement, a preliminary grating pattern is projected on the object, and the non-linear characteristic is determined from the intensity distribution of a detected preliminary deformed grating pattern image. In this determination, the image of a specific partial range within the detected two dimensional image is taken as the subject of the determination, and the existence of a non-linear characteristic in the intensity distribution is determined from fluctuations in a difference intensity which is the difference in image intensity between previously set pixel step intervals in that image region. Where the pitch of the grating pattern is short, the existence of a non-linear characteristic is determined by fluctuations in the difference intensity of an adjacent pixel interval. Where the pitch of the grating pattern is long or where determination of the non-linear characteristic is simplified, the existence of a non-linear characteristic can be determined by a discrete pixel interval difference intensity.

Where the intensity distribution in one cycle of the grating pattern is symmetrical and linear, the absolute value of the difference intensity within one cycle is constant. Where the intensity distribution is non-linear, the absolute value of the difference intensity within the one cycle fluctuates. At this time, a slice intensity level is provided for the difference intensity, and the difference intensity and slice intensity level are compared and determined. If fluctuations of the absolute value of the difference intensity are present in the slice intensity level, the absolute value of the difference intensity is taken to be substantially constant and intensity distribution is determined to be a linear intensity distribution. In this case, actual measurement is performed, fluctuations in the intensity distribution of the deformed grating pattern image are image processed and the three dimensional shape is measured.

Where the fluctuations in the absolute value of the intensity distribution in one cycle of the grating pattern exceed the slice intensity level, the intensity distribution is determined as having a non-linear characteristic. There are many cases where the non-linear characteristic occurs in the vicinity of the peaks of the maximum intensity and minimum intensity of the intensity distribution. In such cases, a region of intermediate intensity between the maximum intensity and minimum intensity of the difference intensity exists. The extent of the non-linear characteristic is determined from a width where the intermediate intensity occurs. Also, the position where the non-linear characteristic occurs is detected from the position where the difference intensity fluctuates. If an intermediate intensity is generated during the period when the difference intensity changes from a maximum intensity to a minimum intensity, it is determined that a non-linear characteristic has occurred in the vicinity of the maximum intensity, and if an intermediate intensity is generated during the period when the difference intensity changes from a minimum intensity to a maximum intensity, it is determined that a non-linear characteristic has occurred in the vicinity of the minimum intensity.

In a case where the intensity distribution is determined to have a non-linear characteristic, it is corrected so that it becomes a linear intensity distribution. The first method of such correction is a method of changing the voltage and the phase between signals of the linear distribution signal to change the drive effective voltage of the liquid crystal grating. where the non-linear characteristic is large, the drive effective voltage is changed to a larger voltage. Where a non-linear characteristic occurs in the vicinity of the maximum intensity of the intensity distribution, the drive effective voltage is controlled so that it is smaller, and where a non-linear characteristic occurs in the vicinity of the minimum intensity, the drive effective voltage is controlled so that it is larger.

The second method of correcting the intensity distribution is a method of changing the number of gradations of the linear distribution signal and changing the effective voltage in accordance with the number of gradations. For example, where a non-linear characteristic occurs in the vicinity of the maximum intensity of the intensity distribution, the number of gradations is reduced and the drive effective voltage is controlled so that it decreases. When the number of gradations has been reduced, the length of one pitch of the grating pattern shortens. Where an inconsistency occurs in measurement due to a change in the grating pitch, adjustment is performed to change the cycle of the linear distribution signal so that the grating pitch lengthens. In this manner a grating pattern set to a linear intensity distribution is projected at an object, and a linear phase distribution is calculated according to the intensity distribution to measure a three dimensional shape.

Figure 14:
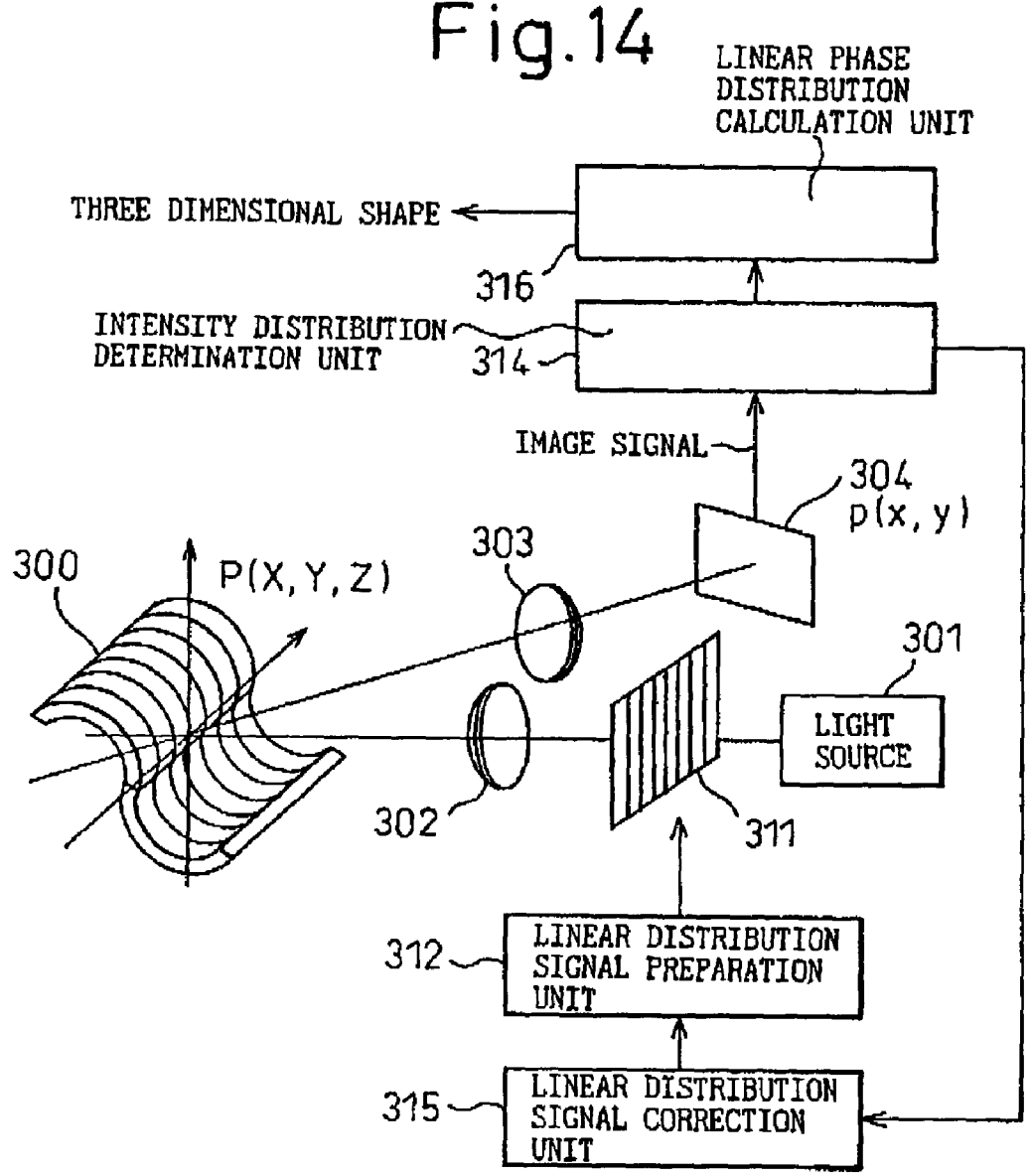
FIG. 14 is a diagram for explaining the structure and operation of a third embodiment of the present invention.

The third embodiment according to the present invention will be explained below using FIG. 14. In FIG. 14, an outline of a grating pattern projection apparatus using a liquid crystal grating is shown. A light source 301 is constructed from a white light source for lighting such as a halogen lamp or the like, and emits a white light onto a liquid crystal grating 311. The liquid crystal grating 311 is constructed by liquid crystal pixels arranged in a predetermined shape (for example striped shape pixel arrangement), and creates a grating pattern having an intensity distribution according to a drive effective voltage applied to each of the liquid crystal pixels. The grating pattern created by the liquid crystal grating 311 is projected through a projecting lens 302 onto the object 300 whose three dimensional shape is to be measured. The intensity distribution in one cycle of the grating pattern of the present invention is set to a linearly distribution. As a result, a linear distribution signal for setting the intensity distribution of the grating pattern to a linear distribution is prepared in the linear distribution signal preparation unit 312, and an effective voltage is applied to the liquid crystal grating 311 according to the voltage and phase of the linear distribution signal.

Due to the liquid crystal grating 311 being constructed with its pixels separated and independent, it is driven by a discrete signal whose drive effective voltage changes in a step shape between pixels. At this time, the step voltage width and number of liquid crystal pixels to which this same step voltage is applied are set in accordance with the size and number of liquid crystal pixels, number of projected grating patterns, number of intensity gradations of the linear intensity distribution, and the like.

Figure 15:
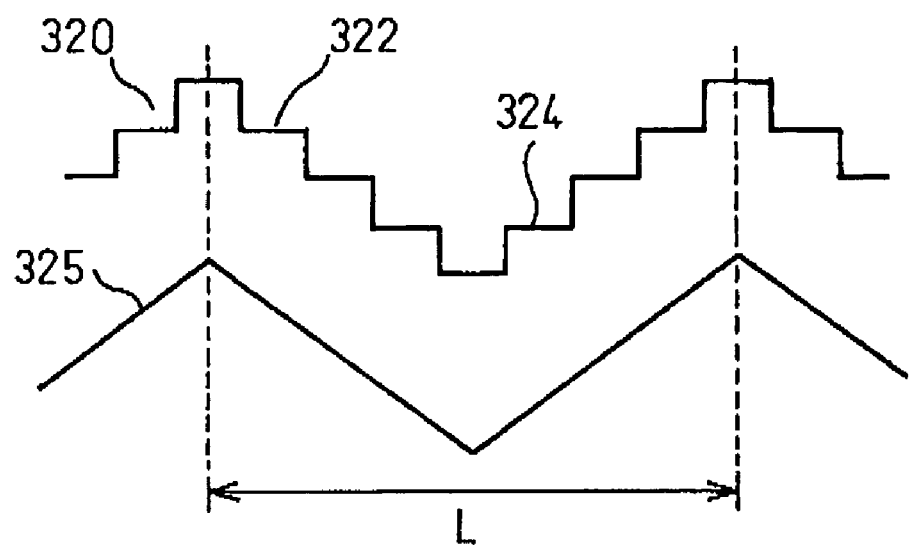
FIG. 15 is a diagram for indicating an example of the waveform of an effective voltage set to a linear intensity distribution.
Figure 28A:
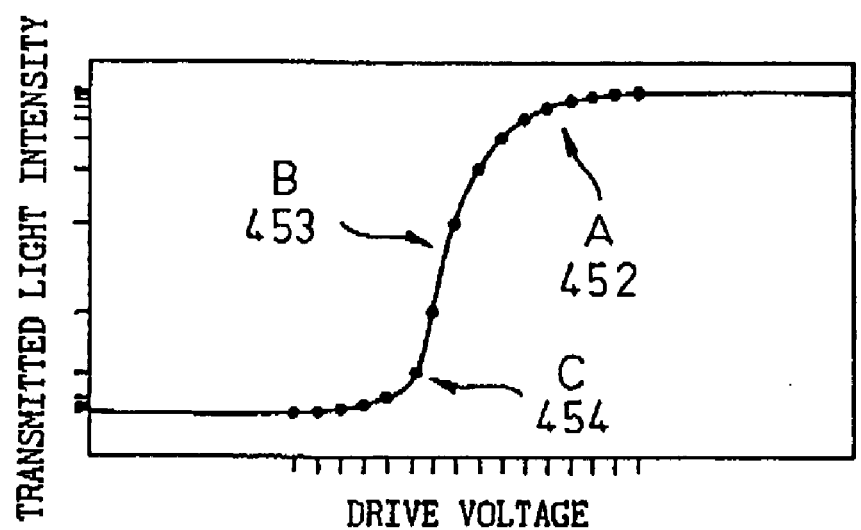
FIG. 28 (a) is a diagram for indicating the relationship between the voltage of the liquid crystal grating and transmitted light intensity.
FIG. 28(b) is a diagram for indicating a discrete sine wave intensity distribution.
Figure 28B:
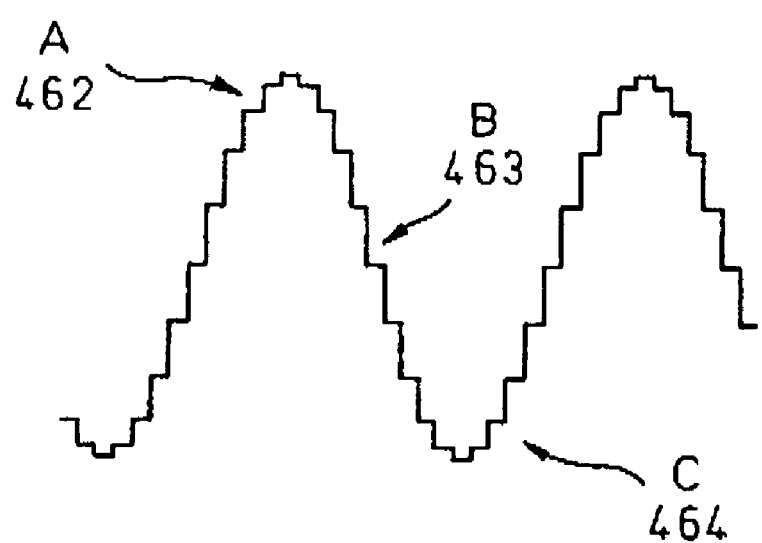

The wave 320 of FIG. 15 is an example of an effective voltage for driving the liquid crystal grating 311, and the effective voltage changes symmetrically in a step shape at linear step widths in the interval L of one cycle. The linear distribution signal that generates this effective voltage will be described later. The waveform 320 is an example of a five gradation signal having five voltage levels between the minimum intensity and the maximum intensity, and the voltage 322 takes the light intensity A452 of FIG. 28(*a*), while the voltage 324 similarly takes the light intensity B453.

The waveform 325 of FIG. 15 is a symmetrical triangular wave signal, has had its intensity changed to link the central portions of the stepped wave of waveform 320, and has intensity increase regions and intensity decrease regions whose widths are equal. when the liquid crystal grating 311 is driven by the discrete signal 320 whose effective voltage changes stepwise and linearly, the actually projected grating pattern has a distribution in which the intensity changes substantially continuously. This is caused by the occurrence of a light blurring effect due to diffraction and the like resulting from the grating pitch of the liquid crystal grating 311 being short. Accordingly, even if the liquid crystal grating 311 is driven by a digitized signal 320, if the drive effective voltage is within the optimum drive voltage range for the liquid crystal grating 311, a grating pattern having a continuous linear intensity distribution such as waveform 325 can be attained.

The grating pattern projected at the object 300 distorts according to the surface irregularities of the object. This deformed grating pattern is detected and stored as a two dimensional image by an image detection portion 304 comprising a CCD, via a projection lens 303 in a direction different to the direction that it was projected from. In the grating pattern projector of the present invention, setting the grating pattern to one having a linear intensity distribution is an important requisite. Measurement errors occur when a grating pattern having a non-linear intensity distribution is projected. Therefore, before the actual three dimensional shape measurement, the grating pattern is provisionally projected at the object 300, and whether the intensity distribution of the detected deformed grating pattern image is correct and a linear distribution is determined by the intensity distribution determination portion 314.

In the determination of the intensity distribution, an image within a specified partial range of the deformed grating pattern image is subject to determination. A difference intensity which is the difference of the image intensity between adjacent pixels within the target region. Where the grating pitch is long or the determination of a non-linear characteristic is simplified, the difference in image intensity between a plurality of discrete pixel steps is detected and determined.

In the case of a symmetrical triangular waveform whose intensity distribution is linear, the absolute value of the difference intensity in that one cycle is constant. Where the size of the absolute value of the detected difference intensity is recognized as substantially constant, it is determined to be a linear intensity distribution. Where it is determined to be a linear intensity distribution, correction of the intensity distribution is not executed, and a deformed grating pattern image is image processed to measure the three dimensional shape. Where the absolute value of the difference intensity fluctuates above a constant, the intensity distribution is determined to have a non-linear characteristic. In the above determination, a slice intensity level is provided, and it is determined whether the absolute value of the difference intensity exceeds the slice intensity level. Cases where the non-linear characteristic of an intensity distribution occur in the vicinity of maximum intensity and minimum intensity peaks are common. In this case the absolute value of the difference intensity exists in a region close to 0. Thus, the extent of the non-linear characteristic is determined from the size of the intermediate intensity level of the difference intensity and the width where the intermediate intensity exists. Also, the position at which a nonlinear characteristic occurs is determined from the position at which the difference intensity fluctuates.

Where it is determined that the intensity distribution has a non-linear characteristic, it is corrected to a linear intensity distribution. This correction is executed by changing the linear distribution signal in the linear distribution signal correcting portion. Correction is executed in a feedback manner by determining the size of the correction according to the extent of the non-linear characteristic and the position at which the non-linear characteristic occurs. A first method for executing correction of the intensity distribution is a method of changing the drive effective voltage applied to the liquid crystal grating 311. In the first method, the voltage level of the linear distribution signal and phase of the signal are changed. If a non-linear characteristic occurs in a maximum intensity region of the intensity distribution, correction is performed to reduce the drive effective voltage. If a non-linear characteristic occurs in a minimum intensity region of the intensity distribution, correction is performed to increase the drive effective voltage.

A second method for executing correction of the intensity distribution is a method of changing the number of gradations of the drive effective voltage applied to the liquid crystal grating 311. For example, if a non-linear characteristic occurs in a maximum intensity region of the intensity distribution, correction is performed to reduce the number of gradations and reduce the drive effective voltage. The grating pattern corrected to a linear intensity distribution by the above controls is projected at the object 300 and a deformed grating pattern image detected. The basic shape of the intensity distribution of the deformed grating pattern is a linear intensity distribution according to the projected grating pattern. The deformed grating pattern image is image processed and a phase distribution that changes linearly is calculated according to the intensity distribution in the linear phase distribution calculations portion 316 to measure the three dimensional shape of the object.

Figure 7:
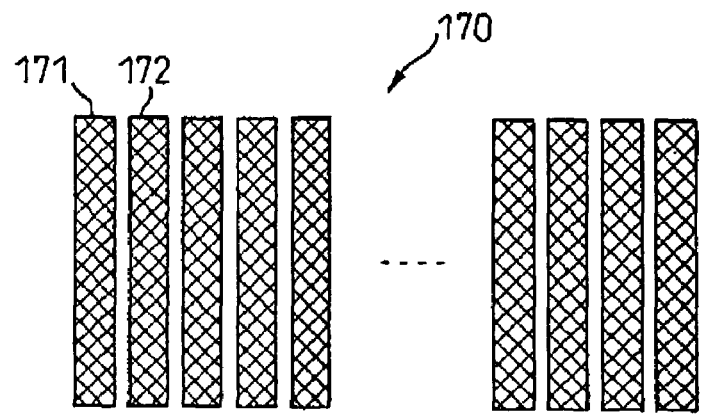
FIG. 7 is a diagram for indicating the structure of a liquid crystal grating having a striped structure.

The electrode structure of the liquid crystal grating 311 in the present embodiment is the same as the structure explained by FIG. 7 with regard to the first embodiment. Also, when preparing a grating pattern with a linear intensity distribution, the example of the drive signal applied liquid crystal grating 311 is the same as the explanatory structure of FIG. 8 relating to the first embodiment.

When preparing a linear intensity distribution, if the intensity gradation in one cycle of the grating pattern is n, and the same voltage is applied to an m number of stripe electrodes per each intensity gradation, the number of grating patterns is N/(n×m). The present invention has the characteristic that, as it is set to linear intensity distribution, even if the number of gradations n is not increased, the same effects are attained as that for a high gradation. As a result, by reducing the number of electrodes m to which the same effective voltage is applied, the number of grating patterns can be increased, and high precision measurement is possible.

Figure 16:
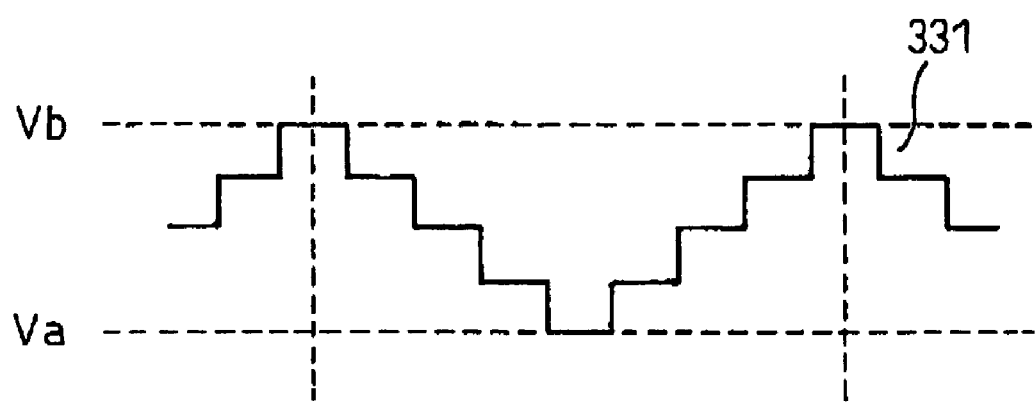
FIG. 16 is a diagram for indicating an example of the waveform of an effective voltage set to a linear intensity distribution.
Figure 17:
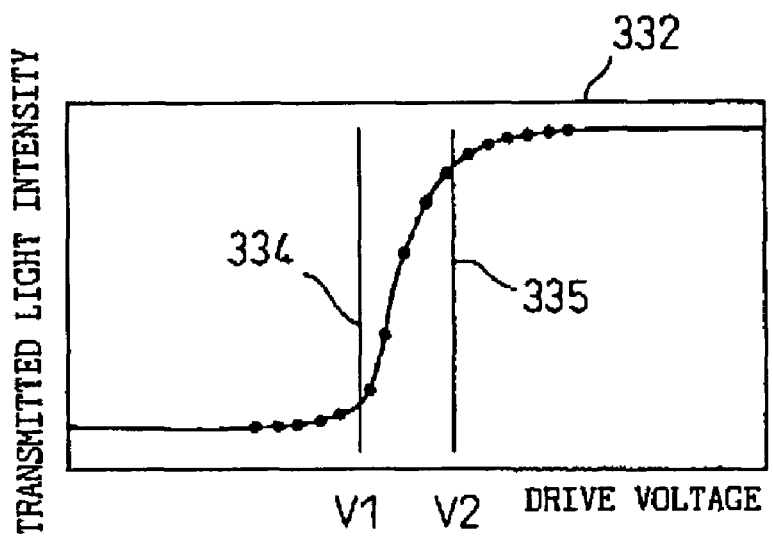
FIG. 17 is a diagram for indicating the relationship between the liquid crystal grating drive voltage and transmitted light intensity.

FIG. 16 shows an example of the intensity distribution of a grating pattern prepared by an effective voltage set to a linear intensity distribution. The waveform 331 of FIG. 16 is a signal that changes stepwise while the effective voltage is between Va and Vb, and is attained by a linear distribution signal. The waveform 332 of FIG. 17 is a transmitted light intensity characteristic with respect to a drive effective voltage of the liquid crystal elements. The line 334 is a low effective voltage V1 and the line 335 is a high effective voltage V2 drive. If the liquid crystal grating 331 is driven within the effective voltage range of V1 and V2, the transmitted light intensity changes linearly. Consequently, the effective voltages Va and Vb must be between V1 and V2.

Figure 18:
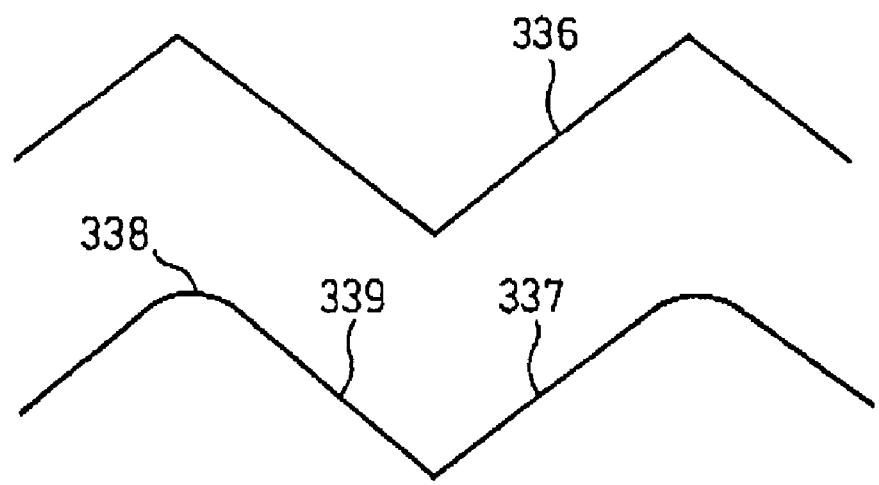
FIG. 18 is a diagram for indicating examples of the waveforms of grating pattern intensity distributions.

The waveform 336 of FIG. 18 is an example of a linear intensity distribution, and waveform 337 is an example of an intensity distribution having a non-linear characteristic. If the effective voltage range (Va to Vb) of the waveform 331 is within the linear voltage range (V1 to V2) of the liquid crystal grating 311, a linear intensity distribution such as that of waveform 336 can be attained. However, even if the effective voltage of the waveform 331 changes linearly, if the voltage range thereof shifts from the linear voltage range of the liquid crystal grating 311, it becomes an intensity distribution having a non-linear characteristic as in the waveform 337. Where, in the waveform 337, the effective voltage value Vb shifts in a direction higher than V2, the intensity in the region 338 in the vicinity of the peak intensity saturates and changes so that it has a non-linear characteristic. in the region 339 lower than the peak intensity, linear intensity distribution is maintained. The present invention corrects an intensity distribution having a non-linear characteristic as in the waveform 337 to the linear intensity distribution of waveform 336.

Figure 19A:
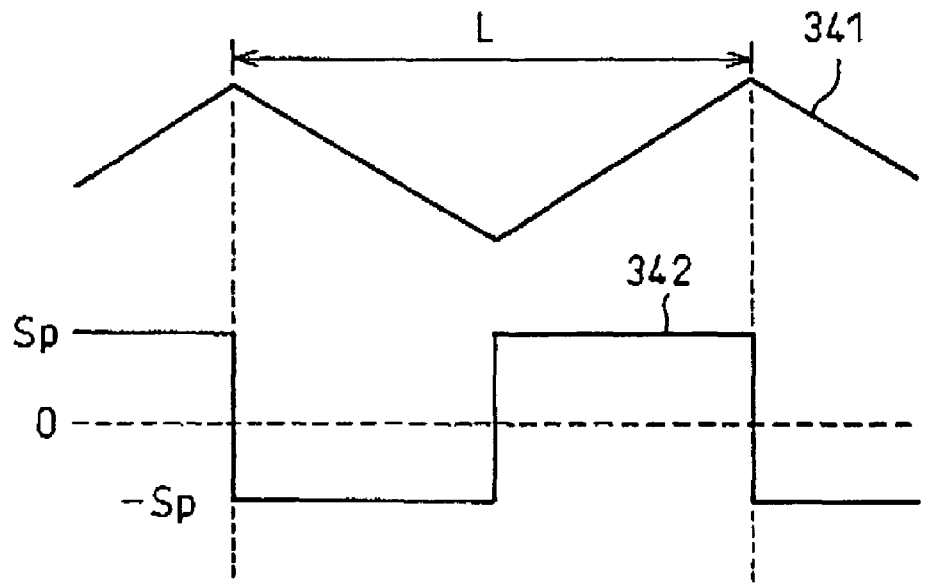
FIG. 19(a) is a diagram for indicating an example of the waveforms of a linear intensity distribution and a difference intensity thereof.

In FIG. 19 an example of determination of the intensity distribution of a grating pattern is shown. In the determination of the intensity distribution, whether the intensity distribution has a non-linear characteristic or not is determined from fluctuations in a difference intensity, using the difference intensity between specific pixels in the deformed grating pattern image detected by the image detection portion 313. FIG. 19(a) is a determination example of a case where the intensity distribution is linear. The waveform 341 is the waveform of a linear intensity distribution, and waveform 342 is the waveform of a difference intensity. The maximum intensity of the difference intensity is Sp, the minimum intensity is −Sp, and the absolute values are each Sp. In the case of the linear intensity distribution (waveform 341), the absolute value of the difference intensity in the interval L of one cycle is constant. Because there is no fluctuation in the difference intensity, in this case it is determined that it is a linear intensity distribution. Consequently, correction of the intensity distribution is not performed.

Figure 19B:
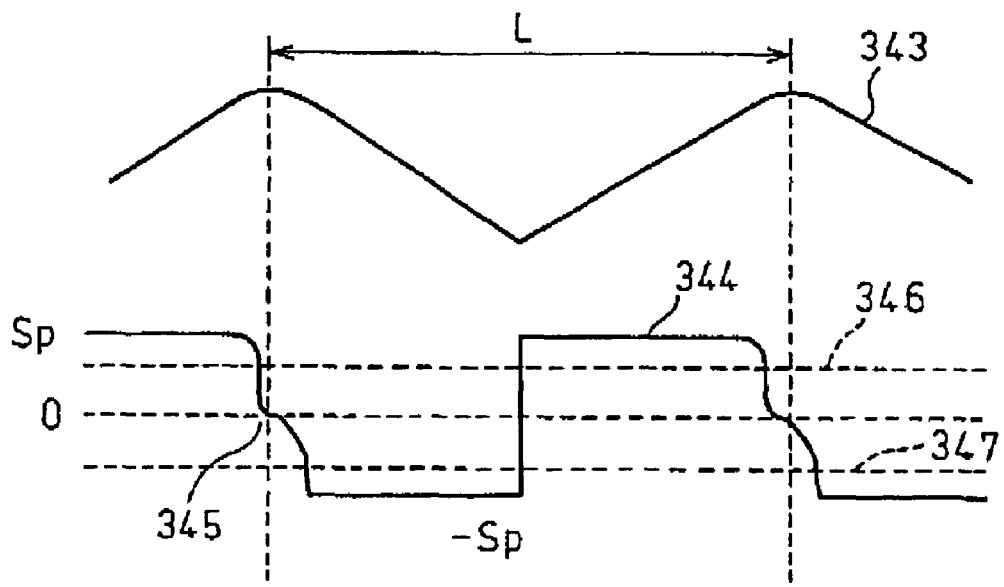
FIG. 19(b) is a diagram for indicating an example of the waveforms of a nonlinear intensity distribution and a difference intensity thereof.

FIG. 19(b) is a case where intensity distribution has a non-linear characteristic. The waveform 343 has a non-linear characteristic in the vicinity of the maximum intensity, and the intensity changes to linear in the other regions. The waveform 344 is a difference intensity waveform, and the absolute value of the difference intensity in the region of the waveform 343 where the intensity distribution changes linearly is Sp. However, in the region 345 corresponding to the vicinity of the maximum intensity of waveform 343, the difference intensity fluctuates and there is a region where the intensity distribution approaches 0. The smaller the rate of intensity change becomes in the vicinity of the maximum intensity, the closer the value of the difference intensity comes to 0. Line 346 and line 347 of waveform 344 are slice intensity levels (absolute value of Ss) that determine fluctuations of the difference intensity. Detected fluctuations of the difference intensity are compared with the slice intensity levels, and where the difference intensity exceeding the set slice intensity level fluctuates, it is determined that the intensity distribution has a non-linear characteristic.

By means of the above determination method, the position where a non-linear characteristic occurs can be determined from the position where the difference intensity fluctuates. In the case of the waveform 343, if a difference intensity close to 0 occurs in the interval during which the difference intensity changes from a maximum value to a minimum value, it is determined that a non-linear characteristic has occurred in the vicinity of the maximum intensity. If a difference intensity close to 0 occurs in the interval during which the difference intensity changes from a minimum value to a maximum value, it is determined that a non-linear characteristic has occurred in the vicinity of the minimum intensity. Further, the extent of the non-linear characteristic is determined by the size of the width at which the absolute value of the difference intensity is substantially close to 0. The above determination of the position and size of the non-linear characteristic is effective when correcting the intensity distribution.

Figure 20:
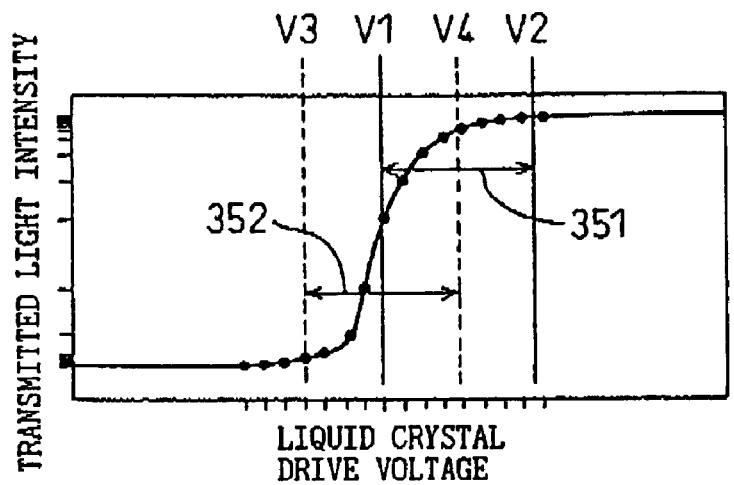
FIG. 20 is a diagram for indicating the relationship between the effective voltage for driving the liquid crystal grating and transmitted light intensity.
Figure 21:
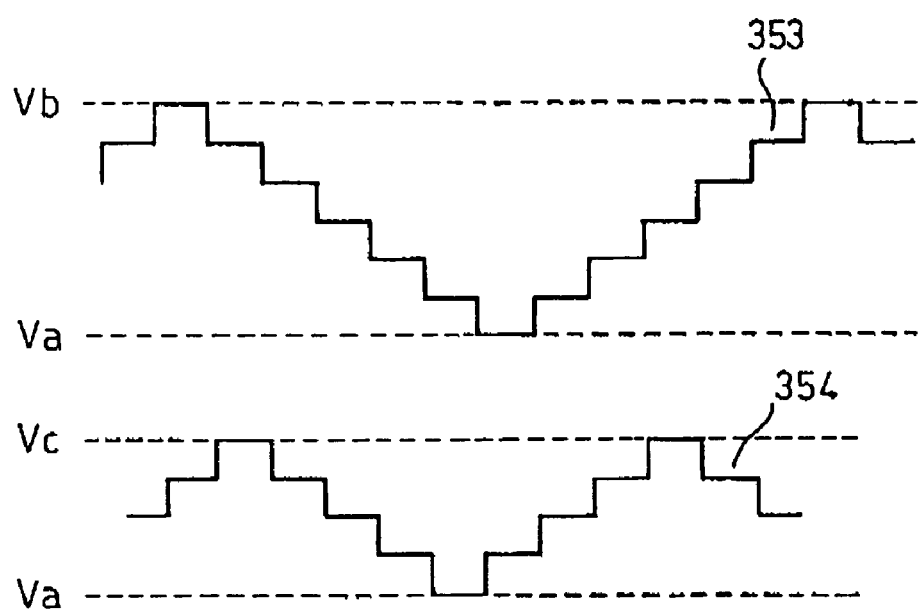
FIG. 21 is a diagram for indicating examples of waveforms where the effective voltage has been changed by changing the number of gradations of the drive signal.

FIG. 20 and FIG. 21 show a method when correcting an intensity distribution having a non-linear characteristic to a linear intensity distribution. FIG. 20 is the light transmission characteristic with respect to the liquid crystal drive voltage, as shown in FIG. 17. If driven at the high voltage range 351 between the effective voltages V1 and V2 indicated by the two solid lines, the signal becomes saturated in the region where the intensity is high, as in the waveform 343 of FIG. 19(b). At this time, the effective voltage is corrected so that it becomes lower. Thus, the drive voltage shifts to the voltage range 352 between the effective voltages V3 and V4 indicated by the dotted lines. In this voltage range 352 saturation of the light intensity does not occur and the intensity distribution can be corrected to linear.

Alternatively, if the intensity distribution in the vicinity of the minimum intensity of the waveform 343 of FIG. 19(b) has a non-linear characteristic, this is a case where the drive effective voltage of the liquid crystal grating 311 is low. In this case, driving at an effective voltage lower than the optimum voltage range 352 is shifted to a voltage range so that it drives at a high effective voltage.

In correcting the intensity distribution by shifting the drive effective voltage as above, the effective voltage is changed by changing the voltage levels V of the rectangular shaped linear distribution signals 181, 182 and 183 shown in FIG. 8. Also, the voltage V of the linear distribution signal is kept constant and the phases of the drive signals 182 and 183 applied to the stripe electrode can be changed with respect to the standard voltage 181 applied to the common electrode, to change the effective voltage. The above control of the effective voltage is performed according to the extent of the non-linear characteristic, if the non-linear characteristic is small, the change to the effective voltage is small, and if the non-linear characteristic is large, the change to the effective voltage is large. Also, the direction in which the effective voltage is changed according to the position where the non-linear characteristic occurs. The above correction is preferably feedback correction executed by repeating the determination and correction a number of times.

A second example of correcting the drive effective voltage is shown in FIG. 21. The waveform 353 of FIG. 21 shows an intensity gradation of the effective voltage applied to the liquid crystal grating 311. The waveform 353 has a minimum intensity Va, a maximum intensity Vb, and seven gradations. As in the waveform 343 of FIG. 19(b), where there is a non-linear characteristic in the region where the intensity is high, the number of gradations can be decreased and the drive effective voltage reduced. The waveform 354 indicates an intensity gradation having a new effective voltage that corrects the intensity distribution. The waveform 354 changes the minimum intensity sets the maximum intensity from Va to Vc, and changes the number of gradations to 5. By reducing the number of gradations in the region where the effective voltage is high, the effective voltage can be lowered and the intensity distribution corrected to linear. The example shown in FIG. 21 is effective where the drive effective voltage is higher than the optimum voltage range.

If the number of gradations is reduced, the interval of one cycle of the grating pattern is shortened. If there is no effect on the measurement even when the pitch of the grating pattern is shortened, measurement is performed with the sort pitch after correction. If the grating pitch is shortened and a fault occurs, the number of stripe electrodes to which a voltage of the same gradation is applied can be increased and the pitch can be simultaneously corrected so that the grating pitch is substantially the same as the waveform 353. For example, if a fault occurs in the measurement of large irregularities due to two adjacent electrodes among the stripe electrodes 170 of FIG. 7 being driven by the same voltage, the grating pitch can be lengthened by driving four adjacent electrodes with the same voltage.

Figure 22:
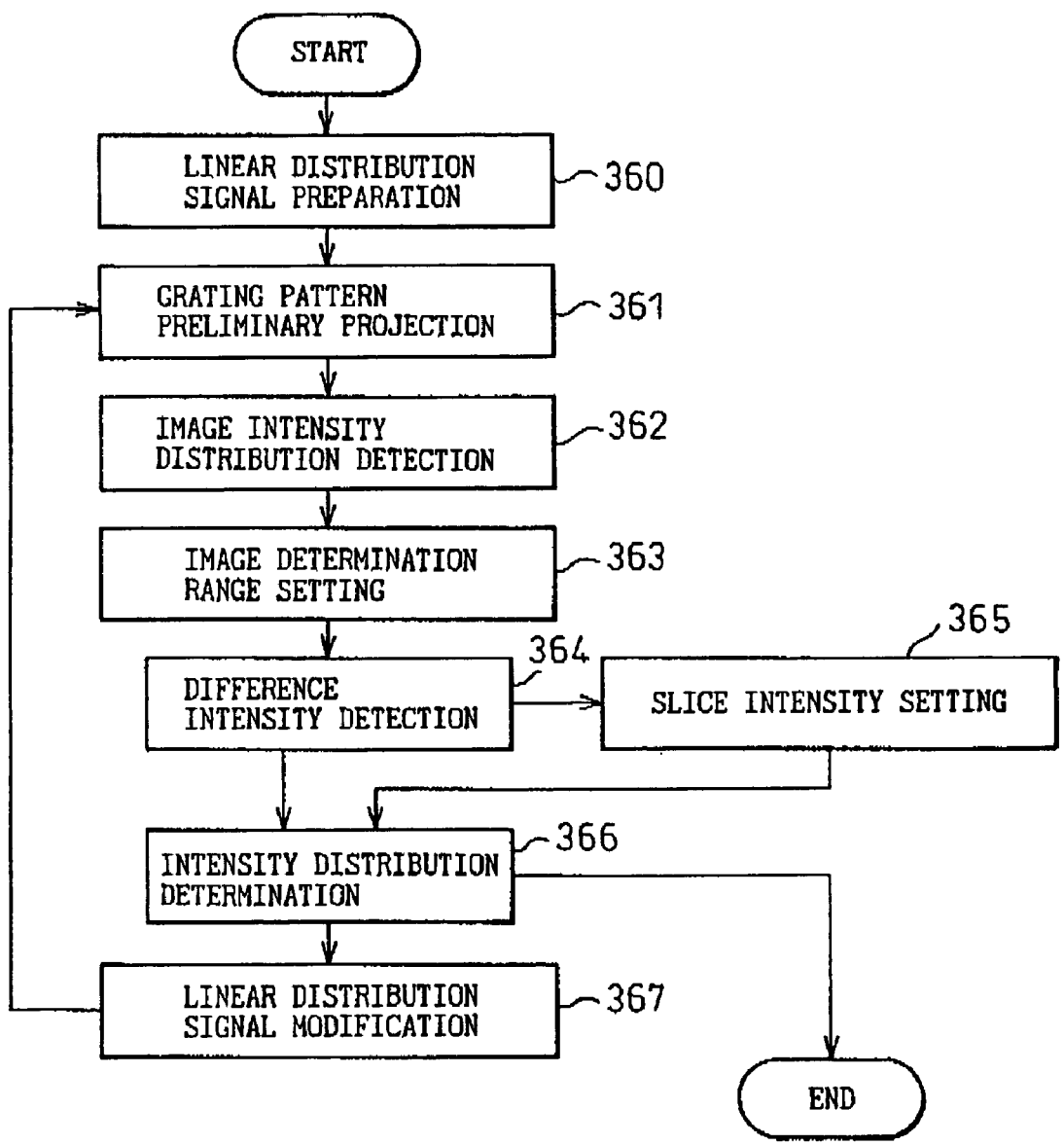
FIG. 22 is a flowchart for explaining an intensity distribution determination and correction operation.

FIG. 22 shows a flow chart for when the intensity distribution is determined and corrected. Step 360, when preparing a linear distribution signal, sets conditions such as number of gradations and pitch of the grating pattern, the drive effective voltage, and the like, prepares a linear distribution signal by modulating a phase difference between rectangular waveform signals as shown in FIG. 8, and drives the liquid crystal grating 311. Step 361 is a preliminary projection of the grating pattern, and is a projection performed to determine whether the intensity distribution of the grating pattern projected at the object is an optimum linear distribution. The intensity distribution of the grating pattern is a distribution according to the effective voltage of the linear distribution signal set in step 360, the surface reflectivity of the object, the brightness of the lighting source, and the like.

Step 362 detects the two dimensional image of the grating pattern, and stores the image detected by the CCD camera or the like. Step 363 sets the range where determination of the intensity distribution of the image is performed, and extracts a partial range of the two dimensional image detected in step 362. By making only a partial range the target for determination, image processing is simplified. Step 364 is detection of the difference intensity, and detects a difference intensity which is the difference in image intensity between adjacent pixels within the set image range. The difference intensity indicates the rate of intensity change of an image and used in determining non-linear characteristics of intensity distributions.

Step 365 is the setting of slice intensity levels with respect to the difference intensity, makes a specific intensity between the maximum value and the minimum value of the difference intensity a slice intensity level, and uses it to determine the size of a fluctuation and the position of a fluctuation of the difference intensity. Step 366 is a intensity distribution determination, and performs determination of whether the intensity distribution of a grating pattern has a non-linear characteristic. In step 366, the fluctuation of the absolute value of the difference intensity detected in step 364 and the absolute value of the slice intensity level set in step 365 are compared. If the fluctuation of the absolute value of the difference intensity is less than the absolute value of the slice intensity level, the intensity distribution is determined as not having a non-linear characteristic, correction of the intensity distribution is not performed, and the intensity distribution correction routine is finished.

In the intensity distribution determination of step 366, if the fluctuation of the absolute value of the difference intensity exceeds the absolute value of the slice intensity level, it is determined that the intensity distribution has a non-linear characteristic. At this time, the extent of the non-linear characteristic is determined from the size of the fluctuation of the absolute value of the difference intensity, and the position at which the non-linear characteristic occurs is determined from the position where the difference intensity fluctuates. Step 367 is a change to the linear distribution signal, and changes the linear distribution signal set in step 360 according to the non-linear characteristic detected in step 366 and the position where the non-linear characteristic occurs. The value of the new effective voltage based on the changed linear distribution signal is applied to the liquid crystal grating 311. Thereafter, the operation is repeatedly executed from step 362. If the intensity distribution becomes linear by way of repeated correction, the correction routine is finished.

Next, the operation of projecting the grating pattern corrected to a linear intensity distribution at the object, and calculating the phase distribution from the intensity distribution of the deformed grating pattern image will be explained.

Figure 23A:
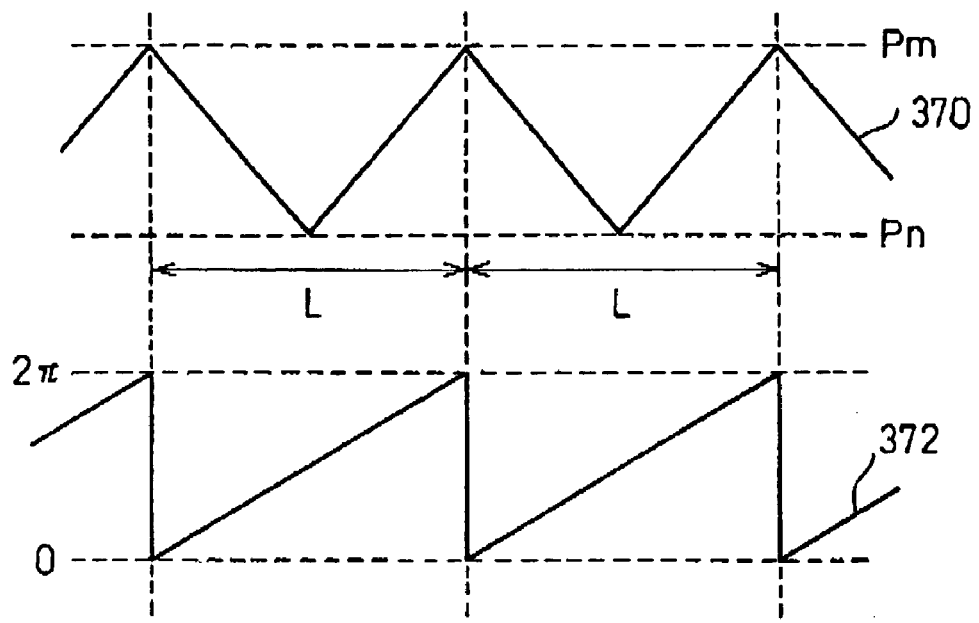
FIG. 23(a) is a diagram for indicating waveform examples showing the grating pattern and phase distribution of a single phase linear intensity distribution.

FIG. 23(a) is a case where a single phase triangular waveform grating pattern is projected. The waveform 370 is the intensity distribution of a projected grating pattern, and waveform 372 is the waveform of a phase distribution attained by image processing. The maximum intensity (Pm) and minimum intensity (Pn) of each cycle of the grating pattern waveform 370 having a linear intensity distribution are detected and stored. The phase distribution of the waveform 372 is the conversion of the intensities of each of the positions in the waveform 370 to linear phase distributions, with the peak intensities Pm and Pn in the interval L of one cycle of the waveform 370 as standards. Since the intensity distribution is a linear distribution, the phase distribution is calculated by simple proportional processing.

Figure 23B:
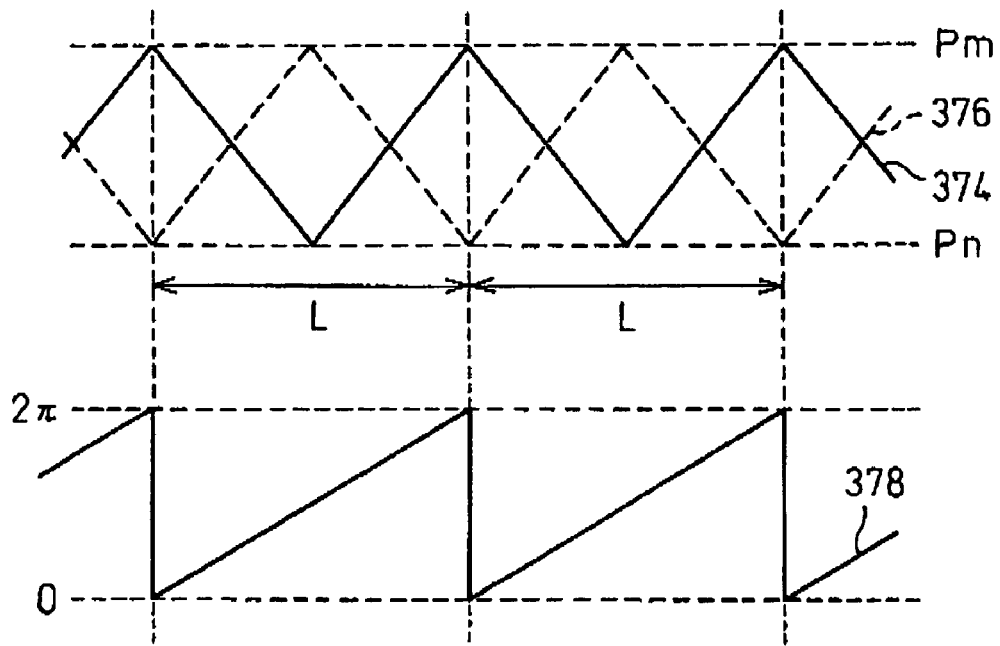
FIG. 23(b) is a diagram for indicating waveform example showing the grating pattern and phase distribution of a dual phase linear intensity distribution.
Figure 24:
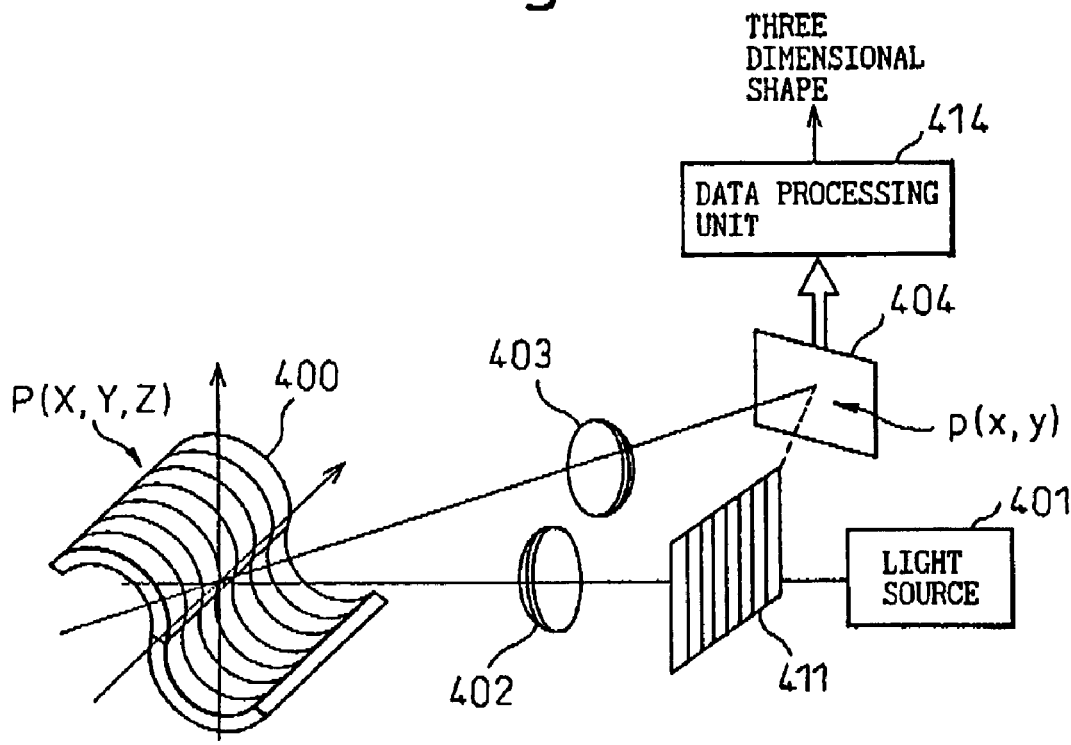
FIG. 24 is a diagram for explaining the principle of the grating pattern projection method.
Figure 25:
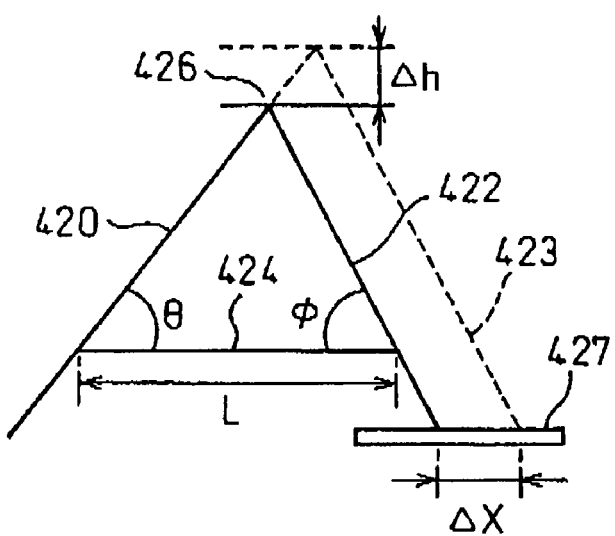
FIG. 25 is a diagram for explaining the principle of the trigonometrical method.
Figure 26A:
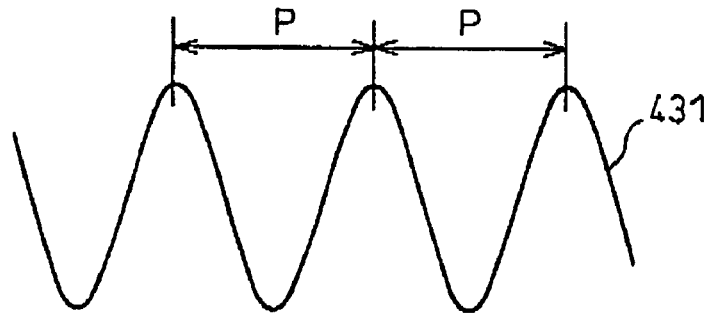
FIG. 26(a) is a diagram for indicating the intensity distribution of a prior art sine wave.
Figure 26B:
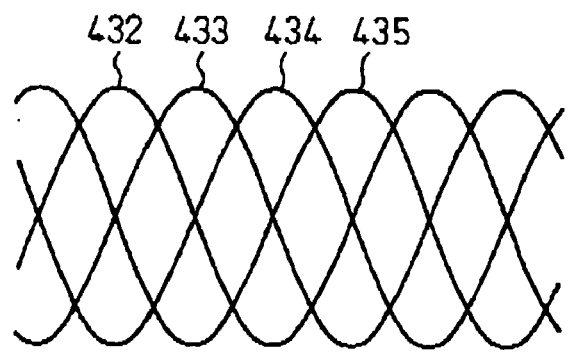
FIG. 26(b) is a diagram for explaining the phase shift of a sine wave.
Figure 27:
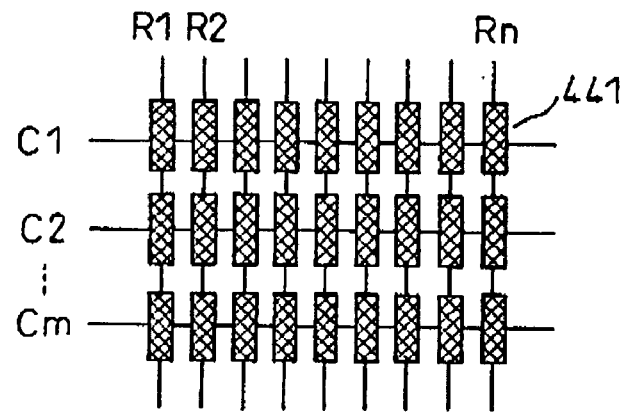
FIG. 27 is a diagram for indicating the structure of a prior art matrix type liquid crystal grating.

FIG. 23(b) is a case where a dual phase linear grating pattern whose intensity distributions are reversed is projected onto an object. Waveforms 374 and 376 show the intensity distributions of a projected grating pattern. The intensity distributions of the waveforms 374 and 376 are mutually inverse. In the case of a dual phase grating pattern, because the intensity sum at each position is constant, this is effective in cases where, for example, the surface reflectivity of the object fluctuates. If the reflectivity is constant the intensity sum is constant, and if the reflectivity fluctuates the intensity sum also fluctuates, therefore fluctuations in the reflectivity can be detected from fluctuations in the intensity sum. FIG. 23(*b*) is an example of a case where the intensity sum is constant and the reflectivity is constant. The waveform 378 is the same intensity distribution as the waveform 372 previously described. The intensity distribution of the waveform 378 is the intensities of each of the positions of the waveform 376 converted to a linear phase distribution, with the peak intensities Pm and Pn of th waveform 376, for example, as standards.

As is clear from the above explanation, the present invention creates a grating pattern having a linear intensity distribution, determines the intensity distribution of the grating pattern projected at an object, and automatically corrects it to a linear intensity distribution if there are non-linear characteristics. A difference intensity is used in the determination of intensity distribution, the size of a non-linear characteristic and the position where the non-linear characteristic occurs are detected from the size of a fluctuation of the difference intensity and the position of the fluctuation. The drive effective voltage of the liquid crystal grating is changed to correct the intensity distribution, according to the extent and position where the non-linear characteristic occurs.

The invention claimed is:

1. A grating pattern projection apparatus, comprising:
a light source;
a liquid crystal grating;
a projector for projecting a grating pattern formed by light emitted from the light source passing through the liquid crystal grating onto an object to be measured;
a liquid crystal driver for driving the liquid crystal grating so that one cycle of the grating pattern has a linear intensity distribution, the liquid crystal driver prepares a triangular wave intensity distribution that a width of an area whose intensity increases linearly and a width of an area whose intensity decreases linearly are equal in one cycle of the grating pattern, and drives the liquid crystal grating so that the grating pattern has a triangular wave intensity distribution;
a detector for detecting a deformed grating pattern deformed by projecting the grating pattern onto an object to be measured; and
a processor for converting the linear intensity distribution of each cycle of the deformed grating pattern into a linear phase distribution for changing a phase linearly;
wherein the processor detects a maximum intensity or a minimum intensity of each cycle of the deformed grating pattern, converts the intensity at each position of the deformed grating pattern into a standardized intensity with the maximum intensity or the minimum intensity as a standard, and performs proportional processing of the standardized intensity to convert an intensity that changes linearly in one cycle of the deformed grating pattern into a phase that changes linearly between 0 and $2\pi$, and
further comprises a smoothing processor for converting an intensity of the deformed grating pattern into an intensity distribution that changes smoothly, and a linear distribution corrector for correcting intensity changes in each intensity increase area and intensity decrease area of the smoothing processed deformed grating pattern into an intensity distribution that approximates a straight line, so that it changes linearly.

2. A grating pattern projection apparatus, comprising:
a light source;
a liquid crystal grating;
a projector for projecting a grating pattern formed by light emitted from the light source passing through the liquid crystal grating onto an object to be measured;
a liquid crystal driver for driving the liquid crystal grating so that one cycle of the grating pattern has a linear intensity distribution;
a detector for detecting a deformed grating pattern deformed by projecting the grating pattern onto an object to be measured; and
a processor for converting the linear intensity distribution of each cycle of the deformed grating pattern into a linear phase distribution for changing a phase linearly,
wherein the grating pattern includes a first grating pattern and a second grating pattern of the same grating pitch and whose intensity distributions are mutually inverse,
the projector sequentially projects the first grating pattern and the second grating pattern individually onto an object to be measured,
the detector sequentially detects a first deformed grating pattern caused by the first grating pattern and a second deformed grating pattern caused by the second grating pattern,
and the processor:
determines whether there is a fluctuation in a reflection state of an object to be measured by detecting changes in a maximum intensity and a minimum intensity of each cycle of the first deformed grating pattern and the second deformed grating pattern, and either one of positions where an intensity of the first and the second deformed grating pattern change discontinuously, or positions where the intensity sum of each position of the first and second deformed grating pattern changes discontinuously; and
converts linear intensity distributions of the first and the second deformed grating pattern to linear phase distributions when the processor determines that the reflection state does not fluctuate, and
when the processor determines that the reflection state does fluctuate, the processor:
converts the intensity distributions within a range where the reflection state fluctuates in the linear intensity distributions of the first and the second deformed grating pattern to a first linear phase distribution for changing a phases linearly;
converts the intensity distributions within a range where the reflection state does not fluctuate in the linear intensity distributions of the first deformed grating pattern and second deformed grating pattern to a second linear phase distribution for changing a phases linearly; and
obtains a linear phase distribution by smoothly connecting the first phase distribution and the second phase distribution at positions where the intensity distributions of the first deformed grating pattern and second deformed grating pattern change discontinuously or positions where the intensity sum of the first and the second deformed grating patterns changes discontinuously.

3. The grating pattern projection apparatus of claim 2, wherein the first grating pattern and the second grating pattern are triangular wave intensity distributions in each single cycle of the grating pattern, in which the width of an area whose intensity increases linearly and the width of an area whose intensity decreases linearly are equal.

4. The grating pattern projection apparatus of claim 2, wherein the processor converts the intensity distributions of the first deformed grating pattern and the second deformed grating pattern into intensity distributions that change smoothly, and corrects the respective intensity distributions of smoothing processed first and second deformed grating patterns to intensity distributions wherein the intensity changes of intensity increase areas and intensity decrease areas approximate straight lines, so that they change linearly.

5. A grating pattern projection apparatus, comprising:
a light source;
a liquid crystal grating;
a projector for projecting a grating pattern formed by light emitted from the light source passing through the liquid crystal grating onto an object to be measured;
a liquid crystal driver for driving the liquid crystal grating so that one cycle of the grating pattern has a linear intensity distribution;
a detector for detecting a deformed grating pattern deformed by projecting the grating pattern onto an object to be measured; and
a processor for converting the linear intensity distribution of each cycle of the deformed grating pattern into a linear phase distribution for changing a phase linearly,
wherein the grating pattern includes a first grating pattern and a second grating pattern of the same grating pitch and whose intensity distributions are mutually inverse,
the projector projects any one of the first grating pattern or the second grating pattern onto an object to be measured when the surface of an object to be measured is formed from a material of uniform reflectivity, and sequentially projects the first grating pattern and the second grating pattern onto the object to be measured when the surface of the object to be measured is formed from a material of a plurality of reflectivities, and
the detector sequentially detects the first deformed grating pattern caused by the first grating pattern and the second deformed grating pattern caused by the second grating pattern.

6. A grating pattern projection apparatus, comprising:
a light source;
a liquid crystal grating;
a projector for projecting a grating pattern formed by light emitted from the light source passing through the liquid crystal grating onto an object to be measured;
a liquid crystal driver for driving the liquid crystal grating so that one cycle of the grating pattern has a linear intensity distribution;
a detector for detecting a deformed grating pattern deformed by projecting the grating pattern onto an object to be measured; and
a processor for converting the linear intensity distribution of each cycle of the deformed grating pattern into a linear phase distribution for changing a phase linearly,
wherein the grating pattern is a pattern of one phase only,
the projector projects a single phase grating pattern onto an object to be measured one time only,
the detector detects a single phase deformed grating pattern caused by the single phase grating pattern one time only, and
the processor has a single phase signal intensity fluctuation detector for detecting a peak intensity of each cycle of the single phase grating pattern, the peak intensity position, and the rate of intensity change, and a phase distribution calculator for converting the single phase deformed grating pattern to a linear phase distribution according to fluctuation of the peak intensity and rate of intensity change.

7. The grating pattern projection apparatus of claim 6, wherein the liquid crystal driver drives the liquid crystal grating so that the grating pattern has a triangular wave intensity distribution, by preparing a triangular wave intensity distribution wherein, in one cycle of the grating pattern, the width of an area whose intensity increases linearly and the width of an area whose intensity decreases linearly are equal.

8. The grating pattern projection apparatus of claim 6, wherein the liquid crystal driver drives the liquid crystal grating by means of a signal whose voltage in one cycle is a discrete stepped shape and changes to symmetrical at half cycles, according to the number of gradations representing the fineness of intensity changes of linear intensity distribution.

9. The grating pattern projection apparatus of claim 6, wherein the single phase signal intensity fluctuation detector, when the peak intensity in each cycle of the single phase deformed grating pattern is constant, obtains a linear phase distribution from a rate of intensity change where the reflectivity of an object to be measured is determined to be constant and, when the peak intensity fluctuates, obtains a linear phase distribution from a peak intensity and a rate of intensity change where the reflectivity of an object to be measured is determined to be fluctuating in the vicinity of positions where the peak intensity fluctuates.

10. The grating pattern projection apparatus of claim 6, wherein the single phase signal intensity fluctuation detector:
detects a rate of intensity change from a difference value of a pixel intensity of a previously set step pixel interval in one cycle of the single phase deformed grating pattern;
sets a slice intensity level for categorizing the rate of intensity change into discrete segments when the rate of intensity change in one cycle fluctuates;
compares the slice intensity level and rate of intensity change and sorts the rate of intensity change into areas according to the slice intensity level; and
detects the boundary positions of the areas.

11. The grating pattern projection apparatus of claim 6, wherein the linear phase distribution calculator, when the rate of intensity change in one cycle of the single phase deformed grating pattern is detected as constant by the single phase signal intensity fluctuation detector, standardizes a phase difference between maximum intensities or minimum intensities in one cycle of the single phase deformed grating pattern to $2\pi$, and converts each pixel position from a proportional relationship between a standard pixel number between maximum intensities or minimum intensities and each pixel position in one cycle to a phase from 0 to $2\pi$, to obtain the linear phase distribution that changes linearly at the constant gradient in one cycle.

12. The grating pattern projection apparatus of claim 6, wherein the linear phase distribution calculator, when the rate of intensity change in one cycle of a single phase deformed grating pattern is detected fluctuating by the single phase signal intensity fluctuation detector, standardizes a phase difference between maximum intensities or minimum intensities in one cycle of the single phase deformed grating pattern to $2\pi$, converts each pixel position within an area according to a proportional relationship between a standard number between maximum intensities or minimum intensities and each pixel position within the area, as well as a slice intensity level of the area, to a phase from 0 to $2\pi$, and connects phases of each area at boundary positions of each area, to obtain the linear phase distribution that changes linearly at a constant gradient in one cycle.

13. A grating pattern projection apparatus, comprising:
a light source;
a liquid crystal grating;
a projector for projecting a grating pattern formed by light emitted from the light source passing through the liquid crystal grating onto an object to be measured;
a liquid crystal driver for driving the liquid crystal grating so that one cycle of the grating pattern has a linear intensity distribution;
a detector for detecting a deformed grating pattern deformed by projecting the grating pattern onto an object to be measured; and
a processor for converting the linear intensity distribution of each cycle of the deformed grating pattern into a linear phase distribution for changing a phase linearly,
wherein the liquid crystal driver drives the liquid crystal grating by means of a preliminary linear intensity distribution signal;
the projector projects a preliminary grating pattern onto an object to be measured according to the preliminary linear intensity distribution signal;
the detector detects a preliminary deformed grating pattern deformed by projecting the preliminary grating pattern onto an object to be measured, and
the liquid crystal driver further comprises,
an intensity distribution judgment unit for detecting a non-linear characteristic of the preliminary deformed grating pattern and positions having a non-linear characteristic, and
a linear distribution signal corrector for, when a non-linear characteristic of the preliminary deformed grating pattern is detected, correcting the preliminary linear intensity distribution signal that the preliminary deformed grating pattern does not have a non-linear characteristic, and
wherein the liquid crystal driver uses a corrected preliminary linear intensity distribution signal to drive the liquid crystal grating for measuring.

14. The grating pattern projection apparatus of claim 13, wherein the intensity distribution judgment unit:
detects a difference intensity between previously set step pixels with respect to one image area of the preliminary deformed grating pattern;
determines that the preliminary deformed grating pattern does not have a non-linear characteristic in a case where an absolute value of a difference intensity in one cycle of the preliminary deformed grating pattern is regarded as substantially constant;
determines that the preliminary deformed grating pattern has a non-linear characteristic in a case where the absolute value of a difference intensity in one cycle of the preliminary deformed grating pattern fluctuates over a previously set limit;
determines that a nonlinear characteristic has occurred in the vicinity of the maximum intensity of the preliminary deformed grating pattern in a case where a difference intensity close to 0 occurs in the vicinity where the difference intensity in one cycle of the preliminary deformed grating pattern changes from a maximum value to a minimum value; and
determines that a nonlinear characteristic has occurred in the vicinity of the minimum intensity of the preliminary deformed grating pattern in a case where a difference intensity close to 0 occurs in the vicinity where the difference intensity in one cycle of the preliminary deformed grating pattern changes from a minimum value to a maximum value.

15. The grating pattern projection apparatus of claim 14, wherein the linear distribution signal corrector:
changes the voltage level of the preliminary linear intensity distribution signal and phases between signals to control a driving effective voltage of the liquid crystal grating, according to the extent of a non-linear characteristic of a preliminary deformed grating pattern determined by the intensity distribution judgment portion and positions where the non-linear characteristic occurs;
performs control to reduce the drive effective voltage of the liquid crystal grating in a case where a non-linear characteristic is determined by the intensity distribution judgment unit to have occurred in a maximum intensity area of the preliminary deformed grating pattern; and
performs control to increase the drive effective voltage in a case where a non-linear characteristic is determined by the intensity distribution judgment unit to have occurred in a minimum intensity area of the preliminary deformed grating pattern.

16. The grating pattern projection apparatus of claim 14, wherein the linear distribution signal corrector:
changes the number of gradations of the preliminary linear intensity distribution signal and phases between signals so as to control a driving effective voltage of the liquid crystal grating according to the extent of a non-linear characteristic of a preliminary deformed grating pattern determined by the intensity distribution judgment unit and positions where the non-linear characteristic occurs; and
reduces the number of gradations where a non-linear characteristic is determined, by the intensity distribution judgment unit, to have occurred in a maximum intensity area of the preliminary deformed grating pattern.

* * * * *

UNITED STATES PATENT AND TRADEMARK OFFICE
CERTIFICATE OF CORRECTION

| | | |
|---|---|---|
| PATENT NO. | : 7,009,718 B2 | Page 1 of 1 |
| APPLICATION NO. | : 10/297409 | |
| DATED | : March 7, 2006 | |
| INVENTOR(S) | : Hiroo Fujita | |

It is certified that error appears in the above-identified patent and that said Letters Patent is hereby corrected as shown below:

On the title page, item (57), delete the Abstract in its entirety and insert therefor:

--In three dimensional shape measurement using a grating pattern projection method, the measuring time is shortened and the precision of three dimensional shape measurement is improved. The grating pattern projection apparatus has a light source (101), a liquid crystal grating (111), a projection unit (102) for projecting onto an object to be measured a grating pattern formed by light emitted from the light source passing through the liquid crystal grating, a liquid crystal driver (112) for driving the liquid crystal grating so that one cycle of the grating pattern has a linear intensity distribution, a detector (104) for detecting a deformed grating pattern distorted by projecting the grating pattern onto the object to be measured, and a processor (114) for converting the linear intensity distribution of each cycle of the deformed grating pattern into a linear phase distribution for changing a phase to linear.--.

*In the title page, insert item (30), claim for foreign priority:

--Japanese Patent Application No. 2000-170083, filed June 7, 2000.

Japanese Patent Application No. 2000-308718, filed October 10, 2000.

Japanese Patent Application No. 2000-374059, filed December 8, 2000.--

*In claim 2, column 38, line 55, "phases" should read --phase--.

In claim 12, column 40, line 61, "detected fluctuating" should read --detected as fluctuating--.

Signed and Sealed this

Twenty-second Day of May, 2007

JON W. DUDAS
*Director of the United States Patent and Trademark Office*